United States Patent
Si et al.

(10) Patent No.: US 11,329,277 B2
(45) Date of Patent: May 10, 2022

(54) SECONDARY BATTERY, BATTERY PACK, ELECTRICALLY DRIVEN VEHICLE, ELECTRIC POWER STORAGE SYSTEM, ELECTRIC TOOL, AND ELECTRONIC DEVICE

(71) Applicant: MURATA MANUFACTURING CO., LTD., Kyoto (JP)

(72) Inventors: Qin Si, Kyoto (JP); Yasuhiro Ikeda, Kyoto (JP); Yosuke Koike, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 358 days.

(21) Appl. No.: 16/732,937

(22) Filed: Jan. 2, 2020

(65) Prior Publication Data

US 2020/0144603 A1    May 7, 2020

Related U.S. Application Data

(63) Continuation of application No. PCT/JP2018/025045, filed on Jul. 2, 2018.

(30) Foreign Application Priority Data

Jul. 3, 2017 (JP) .............................. JP2017-130473

(51) Int. Cl.
*H01M 4/36* (2006.01)
*H01M 4/587* (2010.01)
(Continued)

(52) U.S. Cl.
CPC .......... *H01M 4/364* (2013.01); *H01M 4/386* (2013.01); *H01M 4/587* (2013.01); *H01M 4/623* (2013.01);
(Continued)

(58) Field of Classification Search
CPC ...... H01M 4/362; H01M 4/364; H01M 4/386; H01M 4/583; H01M 4/587; H01M 4/625; H01M 4/663
See application file for complete search history.

(56) References Cited

U.S. PATENT DOCUMENTS

2011/0281166 A1* 11/2011 Cho .................... H01M 4/1391
429/231.5
2016/0204431 A1* 7/2016 Sawa .................... H01M 4/366
429/218.1
(Continued)

FOREIGN PATENT DOCUMENTS

JP    2007-080836      3/2007
JP       4432130 B2    3/2010
(Continued)

OTHER PUBLICATIONS

International Search Report and Written Opinion issued in connection with PCT/JP2018/025045, dated Oct. 2, 2018 (7 pages).
(Continued)

*Primary Examiner* — Christopher P Domone
(74) *Attorney, Agent, or Firm* — K&L Gates LLP

(57) ABSTRACT

A secondary battery includes a positive electrode; a negative electrode including a negative electrode current collector and a negative electrode active material layer which is provided on the negative electrode current collector and contains a negative electrode active material, and an electrolytic solution. The negative electrode active material includes a carbon-containing material and a silicon-containing material, and a spreading resistance distribution in the negative electrode active material layer is 1.03 or more and 10 or less as measured using a scanning spreading resistance microscope.

17 Claims, 7 Drawing Sheets

(51) Int. Cl.
  *H01M 4/38*     (2006.01)
  *H01M 4/62*     (2006.01)
  *H01M 10/0525*  (2010.01)
  *H01M 4/02*     (2006.01)

(52) U.S. Cl.
  CPC ....... *H01M 4/625* (2013.01); *H01M 10/0525* (2013.01); *H01M 2004/021* (2013.01); *H01M 2004/027* (2013.01)

(56) References Cited

U.S. PATENT DOCUMENTS

2016/0285101 A1    9/2016   Toshiba
2016/0322667 A1   11/2016   Maeda et al.
2018/0090762 A1*   3/2018   Mizuno ................. H01M 4/366

FOREIGN PATENT DOCUMENTS

| JP | 2011-100745 A | 5/2011 |
| JP | 4725489 B2 | 7/2011 |
| WO | 2009/131161 A1 | 10/2009 |
| WO | 2011/090060 A1 | 7/2011 |

OTHER PUBLICATIONS

European Search Report dated Feb. 22, 2021 in corresponding European Application No. 18828751.0.

* cited by examiner

SECONDARY BATTERY, BATTERY PACK, ELECTRICALLY DRIVEN VEHICLE, ELECTRIC POWER STORAGE SYSTEM, ELECTRIC TOOL, AND ELECTRONIC DEVICE

CROSS REFERENCE TO RELATED APPLICATIONS

The present application is a continuation of PCT patent application no. PCT/JP2018/025045, filed on Jul. 2, 2018, which claims priority to Japanese patent application no. JP2017-130473 filed on Jul. 3, 2017, the entire contents of which are being incorporated herein by reference.

BACKGROUND

The present technology generally relates to a secondary battery including a negative electrode including a negative electrode current collector and a negative electrode active material layer and a battery pack, an electrically driven vehicle, an electric power storage system, an electric tool, and an electronic device including the secondary battery.

A variety of electronic devices such as mobile phones are widely used, and there is a demand for downsizing, weight saving, and prolonged lifetime of the electronic devices. Hence, the development of secondary batteries which are small and lightweight and capable of providing a high energy density as a power source is underway.

It is investigated to apply secondary batteries not only to electronic devices but also to other applications. Examples of other applications include battery packs detachably mounted on electronic devices, electrically driven vehicles such as electric vehicles, electric power storage systems such as household electric power servers, and electric tools such as electric drills.

Specifically, secondary batteries include an electrolytic solution together with a positive electrode and a negative electrode, and the negative electrode includes a negative electrode current collector and a negative electrode active material layer provided on the negative electrode current collector. The negative electrode active material layer contains a negative electrode active material, and a carbon material such as graphite is used as the negative electrode active material.

Various investigations on the composition of negative electrode have been carried out since the composition of negative electrode greatly affects the battery characteristics. Specifically, in order to ameliorate the cycle life and the like, the constituent conditions of the negative electrode containing silicon and the like have been optimized as well as silicon and the like are used as a negative electrode active material.

SUMMARY

The present technology generally relates to a secondary battery including a negative electrode including a negative electrode current collector and a negative electrode active material layer and a battery pack, an electrically driven vehicle, an electric power storage system, an electric tool, and an electronic device including the secondary battery.

Electronic devices and the like on which secondary batteries are mounted have been sophisticated and multi-functioned more and more. Accordingly, the frequency of use of electronic devices and the like have increased as well as the use environment of the electronic devices and the like have expanded. Hence, there is still room for improvement with regard to the battery characteristics of secondary batteries.

The present technology has been made in view of such a problem, and an object thereof is to provide a secondary battery capable of providing excellent battery characteristics, a battery pack, an electrically driven vehicle, an electric power storage system, an electric tool, and an electronic device.

According to an embodiment of the present technology, a secondary battery is provided. The secondary battery includes a positive electrode; a negative electrode including) a negative electrode current collector and a negative electrode active material layer, and an electrolytic solution. The negative electrode active material layer is provided on the negative electrode current collector and contains a negative electrode active material, and the negative electrode active material includes a carbon-containing material and a silicon-containing material, and a spreading resistance distribution a/b in the negative electrode active material layer is 1.03 or more and 10 or less as measured by a scanning spreading resistance microscope.

A battery pack, an electrically driven vehicle, an electric power storage system, an electric tool, and an electronic device according to an embodiment of the present technology each include a secondary battery, and the secondary battery has a configuration similar to that of the secondary battery as described herein according to an embodiment of the present technology.

Here, the "spreading resistance distribution a/b" is a parameter measured using a scanning spreading resistance microscope (SSRM) as described above. This spreading resistance distribution a/b is a ratio of the spreading resistance a in the lower layer to the spreading resistance b in the upper layer in a case in which the negative electrode active material layer provided on the negative electrode current collector is divided into two equal parts of a lower layer (layer on the side closer to the negative electrode current collector) and an upper layer (layer on the side far from the negative electrode current collector) in the thickness direction. Details of the measurement method and measurement conditions of the spreading resistance distribution a/b will be described later.

In addition, the "carbon-containing material" is the generic term for materials containing carbon as a constituent element and may be a material (carbon material) containing only carbon as a constituent element. In addition, the "silicon-containing material" is the generic term for materials containing silicon as a constituent element and may be a material (simple substance of silicon) containing only silicon as a constituent element.

According to the secondary battery of an embodiment of the present technology, the spreading resistance distribution a/b in the negative electrode active material layer is 1.03 to 10 as measured using a scanning spreading resistance microscope and thus excellent battery characteristics can be attained. In addition, similar effects can be attained in the battery pack, the electrically driven vehicle, the electric power storage system, the electric tool, or the electronic device of the present technology.

Incidentally, the effects described here are not necessarily limited and may be any effect described in the present technology or effects different from these effects.

DETAILED DESCRIPTION

As described herein, the present disclosure will be described based on examples with reference to the drawings, but the present disclosure is not to be considered limited to the examples, and various numerical values and materials in the examples are considered by way of example.

First, a secondary battery of an embodiment of the present technology will be described.

The secondary battery to be described here is, for example, a secondary battery including lithium as an electrode reactant and is more specifically a lithium ion secondary battery in which the battery capacity (the capacity of negative electrode) is attained by utilizing a lithium storage phenomenon and a lithium release phenomenon. This "electrode reactant" is a substance to be used in order to advance the electrode reaction (charge and discharge reaction).

Figure 1:
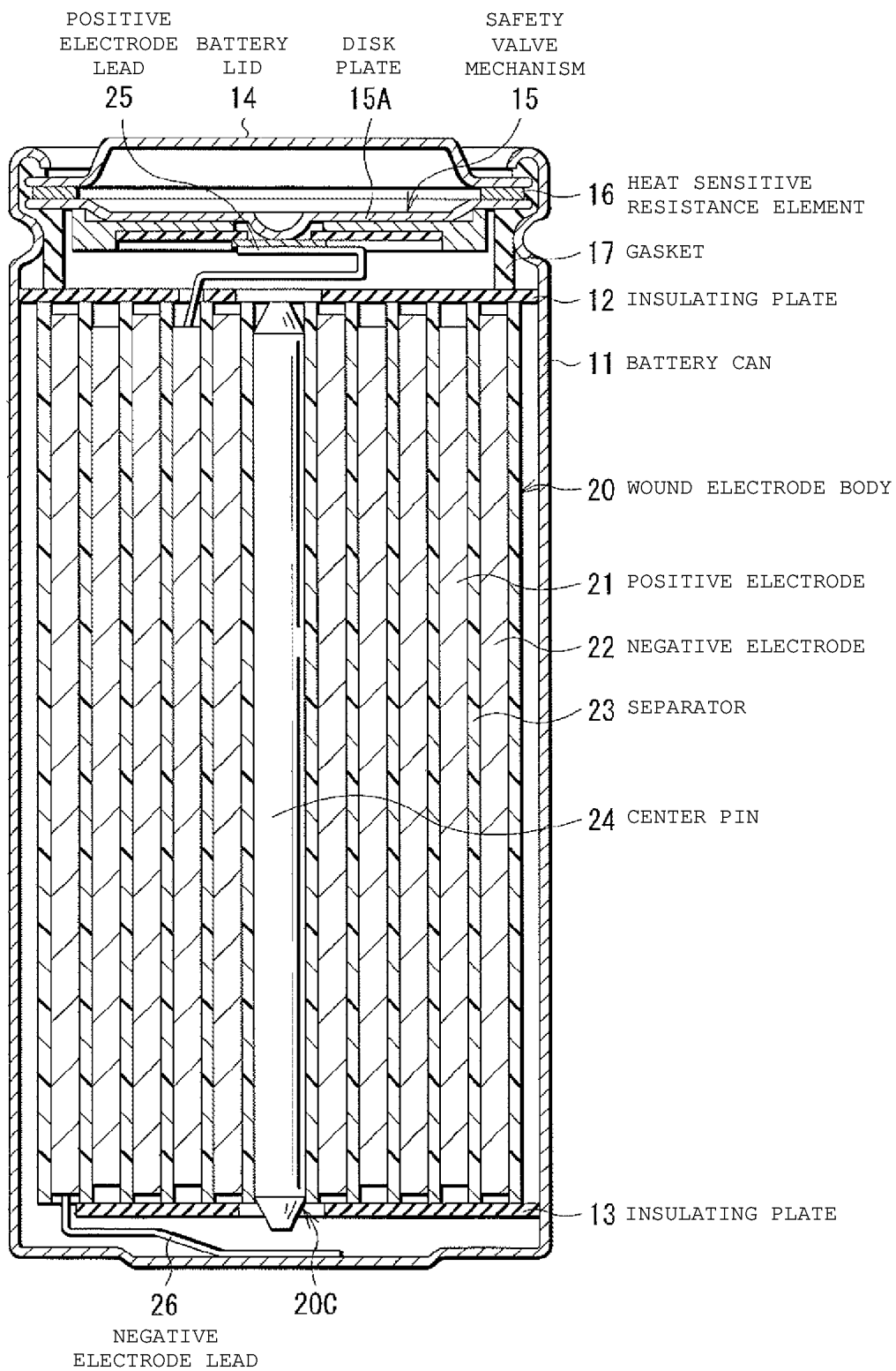
FIG. 1 is a cross-sectional diagram illustrating the configuration of a secondary battery (cylindrical type) according to an embodiment of the present technology.
Figure 2:
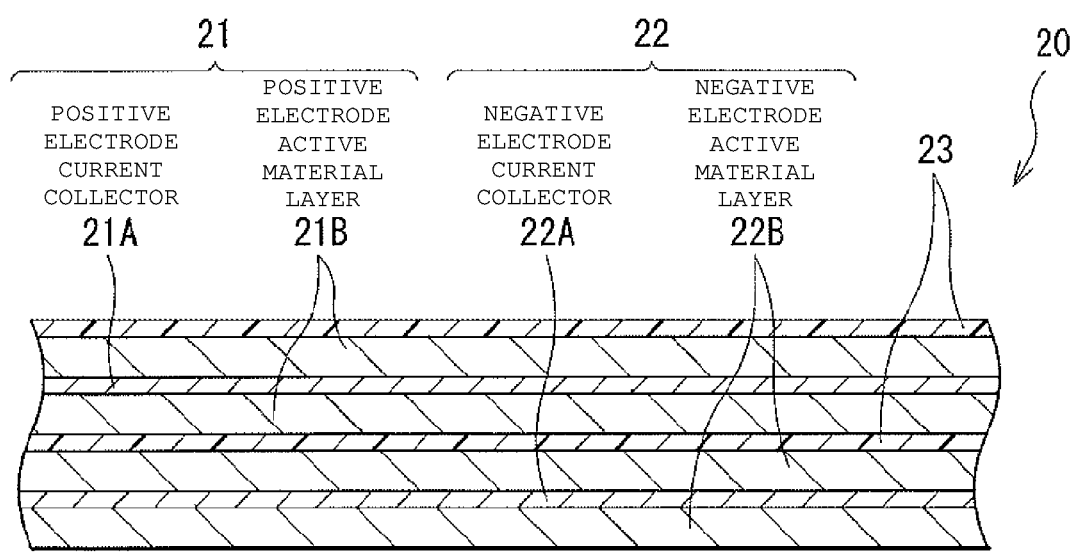
FIG. 2 is an enlarged cross-sectional diagram illustrating a part of the configuration of a wound electrode body illustrated in FIG. 1.

First, the configuration of the secondary battery will be described. FIG. 1 illustrates a cross-sectional configuration of a secondary battery, and FIG. 2 illustrates an enlarged diagram of a part of the cross-sectional configuration of a wound electrode body 20 illustrated in FIG. 1.

This secondary battery is a cylindrical type secondary battery in which a wound electrode body 20 which is a battery element is housed inside a cylindrical battery can 11, for example, as illustrated in FIG. 1.

Specifically, the secondary battery includes, for example, a pair of insulating plates 12 and 13 and the wound electrode body 20 inside the battery can 11.

The battery can 11 has, for example, a hollow structure in which one end portion is closed as well as the other end portion is opened and contains any one kind or two or more kinds among, for example, iron, aluminum, and alloys thereof. For example, a metal material such as nickel may be plated on the surface of the battery can 11.

The pair of insulating plates 12 and 13 are disposed, for example, so as to sandwich the wound electrode body 20 therebetween as well as to extend in a direction perpendicular to the wound peripheral surface of the wound electrode body 20.

A battery lid 14, a safety valve mechanism 15, and a heat sensitive resistance element (PTC element) 16 are crimped to the open end portion of the battery can 11 with a gasket 17 interposed therebetween. The battery can 11 is thus sealed.

The material for forming the battery lid 14 is, for example, the same as the material for forming the battery can 11.

Each of the safety valve mechanism 15 and the heat sensitive resistance element 16 is provided inside the battery lid 14, and the safety valve mechanism 15 is electrically connected to the battery lid 14 via the heat sensitive resistance element 16.

In this safety valve mechanism 15, a disk plate 15A is reversed when the internal pressure of the battery can 11 is raised to a certain value or more by an internal short circuit, external heating and the like, and the electrical connection between the battery lid 14 and the wound electrode body 20 is thus disconnected. In order to prevent abnormal heat generation due to a large current, the electric resistance of the heat sensitive resistance element 16 increases as the temperature increases.

The gasket 17 contains, for example, any one kind or two or more kinds among insulating materials. The surface of the gasket 17 may be coated with, for example, asphalt.

The wound electrode body 20 is formed as, for example, a positive electrode 21 and a negative electrode 22 are stacked with a separator 23 interposed therebetween and then the positive electrode 21, the negative electrode 22, and the separator 23 are wound. This wound electrode body 20 is impregnated with, for example, an electrolytic solution which is a liquid electrolyte.

For example, a center pin 24 is inserted in the space (winding center 20C) provided at the winding center of the wound electrode body 20. However, the center pin 24 may be omitted.

A positive electrode lead 25 is connected to the positive electrode 21, and the positive electrode lead 25 contains any one kind or two or more kinds among, for example, conductive materials such as aluminum. This positive electrode lead 25 is connected to, for example, the safety valve mechanism 15 and is thus electrically conducted to the battery lid 14.

A negative electrode lead 26 is connected to the negative electrode 22, and the negative electrode lead 26 contains any one kind or two or more kinds among, for example, conductive materials such as nickel. This negative electrode lead 26 is connected to, for example, the battery can 11 and is thus electrically conducted to the battery can 11.

The positive electrode 21 includes a positive electrode current collector 21A and two positive electrode active material layers 21B provided on both surfaces of the positive electrode current collector 21A, for example, as illustrated in FIG. 2. However, only one positive electrode active material layer 21B may be provided on one surface of the positive electrode current collector 21A.

The positive electrode current collector 21A contains any one kind or two or more kinds among, for example, conductive materials such as aluminum, nickel, and stainless steel.

This positive electrode current collector 21A may be a single layer or a multilayer.

The positive electrode active material layer 21B contains any one kind or two or more kinds among positive electrode active materials capable of storing and releasing lithium. However, the positive electrode active material layer 21B may further contain any one kind or two or more kinds among other materials such as a positive electrode binder and a positive electrode conductive agent.

The positive electrode active material is preferably a lithium-containing compound. This is because a high energy density is attained. The kind of lithium-containing compound is not particularly limited, but examples of the lithium-containing compound include a lithium-containing composite oxide and a lithium-containing phosphate compound.

The "lithium-containing composite oxide" is the generic term for oxides containing lithium and one or two or more other elements as constituent elements and has any crystal structure among, for example, a layered rock salt type crystal structure and a spinel type crystal structure. The "lithium-containing phosphate compound" is the generic term for phosphate compounds containing lithium and one or two or more other elements as constituent elements and has, for example, an olivine type crystal structure. These "other elements" are elements other than lithium.

The kind of other elements is not particularly limited, but among others, elements belonging to groups 2 to 15 in the extended periodic table are preferable. Specifically, the other elements are, for example, nickel (Ni), cobalt (Co), manganese (Mn), and iron (Fe). This is because a high voltage is attained.

Examples of the lithium-containing composite oxide having a layered rock salt type crystal structure include compounds represented by the following respective Formulas (1) to (3).

$$Li_aMn_{(1-b-c)}Ni_bM11_cO_{(2-d)}Fe \quad (1)$$

(M11 represents at least one kind among cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). a to e satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$. However, the composition of lithium varies depending on the charged and discharged state, and a represents a value in a fully discharged state)

$$Li_aNi_{(1-b)}M12_bO_{(2-c)}F_d \quad (2)$$

(M12 represents at least one kind among cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0.005 \leq b \leq 0.5$, $-0.1 \leq c \leq 0.2$, and $0 \leq d \leq 0.1$. However, the composition of lithium varies depending on the charged and discharged state, and a represents a value in a fully discharged state)

$$Li_aCo_{(1-b)}M13_bO_{(2-c)}F_d \quad (3)$$

(M13 represents at least one kind among nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0 \leq b < 0.5$, $-0.1 \leq c \leq 0.2$, and $0 \leq d \leq 0.1$. However, the composition of lithium varies depending on the charged and discharged state, and a represents a value in a fully discharged state.)

Specific examples of the lithium-containing composite oxide having a layered rock salt type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

Incidentally, in a case in which the lithium-containing composite oxide having a layered rock salt type crystal structure contains nickel, cobalt, manganese, and aluminum as constituent elements, the atomic ratio of nickel is preferably 50 atomic % or more. This is because a high energy density is attained.

Examples of the lithium-containing composite oxide having a spinel type crystal structure include a compound represented by the following Formula (4).

$$Li_aMn_{(2-b)}M14_bO_cF_d \quad (4)$$

(M14 represents at least one kind among cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.9 \leq a \leq 1.1$, $0 \leq b \leq 0.6$, $3.7 \leq c \leq 4.1$, and $0 \leq d \leq 0.1$. However, the composition of lithium varies depending on the charged and discharged state, and a represents a value in a fully discharged state.)

Specific examples of the lithium-containing composite oxide having a spinel type crystal structure include $LiMn_2O_4$.

Examples of the lithium-containing phosphate compound having an olivine type crystal structure include a compound represented by the following Formula (5).

$$Li_aM15PO_4 \quad (5)$$

(M15 represents at least one kind among cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies $0.9 \leq a \leq 1.1$. However, the composition of lithium varies depending on the charged and discharged state, and a represents a value in a fully discharged state.)

Specific examples of the lithium-containing phosphate compound having an olivine type crystal structure include $LiFePO_4$, $LiMnPO_4$, $LiFe_{0.5}Mn_{0.5}PO_4$, and $LiFe_{0.3}Mn_{0.7}PO_4$.

Incidentally, the lithium-containing composite oxide may be a compound represented by the following Formula (6).

$$(Li_2MnO_3) \times (LiMnO_2)_{1-x} \quad (6)$$

(x satisfies $0 \leq x \leq 1$. However, the composition of lithium varies depending on the charged and discharged state, and x represents a value in a fully discharged state.)

In addition to these, the positive electrode active material may be, for example, oxides, disulfides, chalcogenides, and conductive polymers. Examples of the oxides include titanium oxide, vanadium oxide, and manganese dioxide. Examples of the disulfides include titanium disulfide and molybdenum sulfide. Examples of the chalcogenides include niobium selenide. Examples of the conductive polymers include sulfur, polyaniline, and polythiophene.

The positive electrode binder contains any one kind or two or more kinds among, for example, synthetic rubber and polymer compounds. Examples of the synthetic rubber include styrene butadiene-based rubber, fluorine-based rubber, and ethylene propylene diene. Examples of the polymer compounds include polyvinylidene fluoride and polyimide.

The positive electrode conductive agent contains any one kind or two or more kinds among, for example, conductive materials such as carbon materials. Examples of these carbon materials include graphite, carbon black, acetylene black, and ketjen black. However, the positive electrode conductive agent may contain a metal material, a conductive polymer and the like as long as they are conductive materials.

The negative electrode 22 includes a negative electrode current collector 22A and two negative electrode active material layers 22B provided on both surfaces of the negative electrode current collector 22A, for example, as illustrated in FIG. 2. However, only one negative electrode active material layers 22B may be provided on one surface of the negative electrode current collector 22A.

The negative electrode current collector 22A contains any one kind or two or more kinds among, for example, conductive materials such as copper, aluminum, nickel, and stainless steel. This negative electrode current collector 22A may be a single layer or a multilayer.

It is preferable that the surface of the negative electrode current collector 22A is roughened. This is because the close contact property of the negative electrode active material layer 22B with respect to the negative electrode current collector 22A is improved by the so-called anchor effect. In this case, the surface of the negative electrode current collector 22A may be roughened at least in a region facing the negative electrode active material layer 22B. Examples of the roughening method include a method in which fine particles are formed by utilizing an electrolytic treatment. In the electrolytic treatment, fine particles are formed on the surface of the negative electrode current collector 22A in an electrolytic bath by an electrolytic method, and thus irregularities are provided on the surface of the negative electrode current collector 22A. A copper foil fabricated by an electrolytic method is generally called an electrolytic copper foil.

The negative electrode active material layer 22B contains any one kind or two or more kinds among negative electrode active materials capable of storing and releasing lithium. However, the negative electrode active material layer 22B may further contain any one kind or two or more kinds among other materials such as a negative electrode binder and a negative electrode conductive agent.

In order to prevent unintentional precipitation of lithium metal on the negative electrode 22 during charging, it is preferable that the chargeable capacity of the negative electrode material is greater than the discharge capacity of the positive electrode 21. In other words, it is preferable that the electrochemical equivalent of the negative electrode material capable of storing and releasing lithium is greater than the electrochemical equivalent of the positive electrode 21.

The negative electrode active material contains a carbon-containing material and a silicon-containing material. The kind of carbon-containing material may be only one kind or two or more kinds. In addition, the kind of silicon-containing material may be only one kind or two or more kinds.

The "carbon-containing material" is the generic term for materials containing carbon as a constituent element and may be a material (carbon material) containing only carbon as a constituent element as described above.

The reason why the negative electrode active material contains a carbon-containing material is because the crystal structure of the carbon-containing material hardly changes at the time of storage and release of lithium and thus a high energy density is stably attained. In addition, this is because a carbon-containing material also functions as a negative electrode conductive agent and thus the conductivity of the negative electrode active material layer 22B is improved.

Examples of the carbon-containing material include graphitizable carbon, non-graphitizable carbon, and graphite. However, the spacing of (002) plane of non-graphitizable carbon is preferably 0.37 nm or more as well as the spacing of (002) plane of graphite is preferably 0.34 nm or less.

More specific examples of the carbon-containing material include pyrolytic carbons, cokes, glassy carbon fibers, organic polymer compound fired bodies, activated carbon, and carbon blacks. These cokes include pitch coke, needle coke, petroleum coke and the like. An organic polymer compound fired body is a fired product obtained by firing (carbonizing) a polymer compound such as a phenol resin and a furan resin at a proper temperature. In addition to these, the carbon-containing material may be, for example, low crystalline carbon subjected to a heat treatment at a temperature of about 1000° C. or less or amorphous carbon. Incidentally, the shape of the carbon-containing material may be any of a fibrous shape, a spherical shape, a granular shape, or a flaky shape.

The "silicon-containing material" is the generic term for materials containing silicon as a constituent element and may be a material (simple substance of silicon) containing only silicon as a constituent element as described above. The reason why the negative electrode active material contains a silicon-containing material is because the silicon-containing material exhibits property of easily storing and releasing lithium and thus a significantly high energy density is attained.

The silicon-containing material may be a simple substance of silicon, an alloy of silicon, a compound of silicon, two or more kinds among these, or a material having phases of one kind or two or more kinds among these at least at a part. The construction of this silicon-containing material is, for example, a solid solution, a eutectic (eutectic mixture), an intermetallic compound, and a material in which two or more kinds among these coexist.

The "simple substance" described here is a simple substance in a general sense to the utmost, and thus the simple substance may contain a small amount of impurities. In other words, the purity of the simple substance is not necessarily limited to 100%. In addition, the "alloy" includes a material containing one or more kinds of metal elements and one or more kinds of metalloid elements in addition to a material composed of two or more kinds of metal elements, and the "alloy" may contain a nonmetallic element. The definitions of the simple substance and alloy described here are the same in the following.

The alloy of silicon contains any one kind or two or more kinds among tin, nickel, copper, iron, cobalt, manganese, zinc, indium, silver, titanium, germanium, bismuth, antimony, chromium, and the like, for example, as constituent elements other than silicon. The compound of silicon contains any one kind or two or more kinds among carbon, oxygen and the like, for example, as constituent elements other than silicon. However, the compound of silicon may contain, for example, any one kind or two or more kinds among a series of elements described in the alloy of silicon as constituent elements other than silicon.

Specific examples of the alloy and compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO. Incidentally, v in $SiO_v$ may be $0.2<v<1.4$.

The reason why the negative electrode active material contains both the carbon-containing material and the silicon-containing material is because the advantages to be described below are attained. The silicon-containing material has an advantage of having a high theoretical capacity but has a concern of being likely to violently expand and contract at the time of charging and discharging. On the other hand, the carbon-containing material has a concern of having a low theoretical capacity but has an advantage of being less likely to expand and contract at the time of charging and discharging. Hence, by concurrent use of the carbon-containing material and the metal-containing material, a high theoretical capacity (namely, battery capacity) is attained while expansion and contraction of the negative electrode active material is suppressed at the time of charging and discharging.

The carbon-containing material is, for example, a plurality of particulate (powdery) carbon-containing materials as well as the silicon-containing material is, for example, a plurality of particulate (powdery) silicon-containing materials. In this case, the average particle diameter of the plurality of particulate carbon-containing materials is not particularly limited as well as the average particle diameter of the plurality of particulate silicon-containing materials is not particularly limited.

Among these, the 10% particle diameter D10 of the plurality of particulate silicon-containing materials which may greatly affect the electric resistance of the entire negative electrode active material layer 22B is preferably 1 μm to 5 μm. This is because the electric resistance of the entire negative electrode active material layer 22B stably and sufficiently decreases while the binding property of the plurality of particulate silicon-containing materials is secured.

In detail, in a case in which the 10% particle diameter D10 is smaller than 1 μm, the plurality of particulate silicon-containing materials are less likely to be bound to each other with the negative electrode binder interposed therebetween and thus a free negative electrode binder is likely to be generated. In this case, in the step of forming the negative electrode active material layer 22B to be described later (steps of applying and drying a negative electrode mixture slurry), the plurality of particulate silicon-containing materials are likely to move to the surface of the negative electrode active material 22B and thus are likely to be localized in the negative electrode active material layer 22B. By this, the electric resistance of the entire negative electrode active material layer 22B may increase.

On the other hand, in a case in which the 10% particle diameter D10 is greater than 5 μm, the specific surface area of each of the plurality of particulate silicon-containing materials increases and thus the negative electrode binder is likely to be insufficient. In this case, the plurality of particulate silicon-containing materials are less likely to be bound to each other with the negative electrode binder interposed therebetween as well as the plurality of particulate silicon-containing materials which have been bound to each other with the negative electrode binder interposed therebetween are likely to be separated from each other when charging and discharging is repeated. By this, the binding property of the plurality of particulate silicon-containing materials may be diminished.

In this case, the relation between the average particle diameter of the plurality of particulate carbon-containing materials and the average particle diameter of the plurality of particulate silicon-containing materials is not particularly limited.

Among others, the ratio (particle diameter ratio) of the median diameter D50 of the plurality of particulate silicon-containing materials to the median diameter D50 of the plurality of particulate carbon-containing materials is preferably 0.1 to 0.5. This is because a high energy density is attained while the binding property of the plurality of particulate carbon-containing materials and the binding property of the plurality of particulate silicon-containing materials are secured, and the electric resistance of the entire negative electrode active material layer 22B stably and sufficiently decreases. Incidentally, the value at the third decimal place is rounded off in the case of calculating the particle diameter ratio.

In detail, in a case in which the particle diameter ratio is less than 0.1, the average particle diameter of the plurality of particulate silicon-containing materials is too smaller than the average particle diameter of the plurality of particulate carbon-containing materials and thus the energy density may decrease.

On the other hand, in a case in which the particle diameter ratio is greater than 0.5, the average particle diameter of the plurality of particulate silicon-containing materials is too greater than the average particle diameter of the plurality of particulate carbon-containing materials, and thus the plurality of particulate silicon-containing materials are less likely to be bound to each other with the negative electrode binder interposed therebetween as well as and the electric resistance of the entire negative electrode active material layer 22B may increase.

Moreover, for example, in a case in which the carbon-containing material is a plurality of particulate carbon-containing materials, the shape of the plurality of particulate carbon-containing materials is not particularly limited.

Among others, the average aspect ratio of the plurality of particulate carbon-containing materials is preferably 1.1 to 2.0. This is because the electric resistance of the negative electrode active material layer 22B is less likely to fluctuate while the dispersion stability and structural stability of the plurality of particulate carbon-containing materials are secured.

In detail, in a case in which the average aspect ratio is smaller than 1.1, the plurality of particulate carbon-containing materials are likely to be deformed or damaged in the step of preparing a negative electrode mixture to be described later and thus the electric resistance of the entire negative electrode active material layer 22B may be likely to fluctuate.

On the other hand, in a case in which the average aspect ratio is greater than 2.0, the plurality of particulate carbon-containing materials are less likely to be dispersed in the step of preparing a negative electrode mixture slurry to be described later and thus the electric resistance of the entire negative electrode active material layer 22B may be likely to fluctuate in this case as well.

This average aspect ratio is calculated, for example, according to the procedure to be described below. First, the cross section (the plurality of particulate carbon-containing materials) of the negative electrode active material layer 22B is observed under a scanning electron microscope and the like. The conditions such as observation range and observation magnification can be arbitrarily set. Subsequently, the aspect ratio=major axis dimension/minor axis dimension is calculated by measuring each of the major axis dimension and the minor axis dimension for each of the carbon-containing materials based on the observation result (photomicrograph) of the cross section of the negative electrode active material layer 22B. In this case, the number of aspect ratios calculated is set to 100, that is, the number of carbon-containing materials of which the aspect ratio is calculated is set to 100. Incidentally, each of the major axis dimension and the minor axis dimension may be measured manually or automatically using image processing software and the like. Finally, the average aspect ratio is determined by calculating the average value of 100 aspect ratios.

Incidentally, the mixing ratio of the carbon-containing material to the silicon-containing material is not particularly limited.

Among others, the content of the silicon-containing material in the negative electrode active material, namely, the proportion (active material proportion) of the weight of the silicon-containing material to the sum of the weight of the carbon-containing material and the weight of the silicon-containing material is preferably 30% by weight or less and more preferably 5% by weight to 30% by weight. This is because the mixing ratio of the carbon-containing material to the silicon-containing material is optimized and thus both suppression of expansion and contraction of the negative electrode active material at the time of charging and discharging and securing of a high theoretical capacity are achieved. Incidentally, the value at the third decimal place is rounded off in the case of calculating the active material proportion.

Incidentally, the negative electrode active material may further contain any one kind or two or more kinds among other materials (other negative electrode active materials) in addition to the carbon-containing material and silicon-containing material described above. The kind of the other material is not particularly limited as long as it is a material capable of storing and releasing lithium.

The other material is, for example, a metal-based material. The kind of metal-based material may be only one kind or two or more kinds. This "metal-based material" is the generic term for materials containing any one kind or two or more kinds among metal elements and metalloid elements as constituent elements. This is because a high energy density is attained. However, the silicon-containing material described above is excluded from the metal-based material to be described here.

The metal-based material may be a simple substance, an alloy, a compound, two or more kinds among these, or a material having phases of one kind or two or more kinds among these at least at a part. The construction of this metal-based material is, for example, a solid solution, a eutectic (eutectic mixture), an intermetallic compound, and a material in which two or more kinds among these coexist.

The metal element is a metal element capable of forming an alloy with lithium, and the metalloid element is a metalloid element capable of forming an alloy with lithium. Specific examples of the metal element and the metalloid element include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

Among others, tin is preferable. This is because tin exhibits property of easily storing and releasing lithium and thus a significantly high energy density is attained.

The material containing tin as a constituent element may be a simple substance of tin, an alloy of tin, a compound of tin, two or more kinds among these, or a material having phases of one kind or two or more kinds among these at least at a part.

The alloy of tin contains any one kind or two or more kinds among silicon, nickel, copper, iron, cobalt, manganese, zinc, indium, silver, titanium, germanium, bismuth, antimony, chromium, and the like, for example, as constituent elements other than tin. The compound of tin contains any one kind or two or more kinds among carbon, oxygen and the like, for example, as constituent elements other than tin. Incidentally, the compound of tin may contain any one kind or two or more kinds among a series of elements described in the alloy of tin, for example, as constituent elements other than tin.

Specific examples of the alloy and compound of tin include $SnO_w$ ($0<w\leq 2$), $SnSiO_3$, $LiSnO$, and $Mg_2Sn$.

In particular, it is preferable that the material containing tin as a constituent element is a tin-containing material. This "tin-containing material" is the generic term for materials containing a second constituent element and a third constituent element together with tin which is the first constituent element. The second constituent element is any one kind or two or more kinds among, for example, cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element is any one kind or two or more kinds among, for example, boron, carbon, aluminum, and phosphorus. This is because a high battery capacity, excellent cycle characteristics and the like are attained.

Among these, it is preferable that the tin-containing material is a tin cobalt carbon-containing material. This "tin cobalt carbon-containing material" is the generic term for materials containing tin, cobalt, and carbon as constituent elements. In this tin cobalt carbon-containing material, for example, the carbon content is 9.9% by mass to 29.7% by mass and the proportion (Co/(Sn+Co)) of tin and cobalt content is 20% by mass to 70% by mass. This is because a high energy density is attained.

It is preferable that the tin cobalt carbon-containing material has a phase containing tin, cobalt, and carbon as constituent elements and the phase is low crystalline or amorphous. This phase is a phase (reaction phase) capable of reacting with lithium, and thus excellent characteristics are attained by the presence of this reaction phase. It is preferable that the half value width (diffraction angle 2θ) of the diffraction peak attained by X-ray diffraction of this reaction phase is 1° or more in a case in which CuKα ray is used as the specific X-ray as well as the insertion speed is set to 1°/min. This is because lithium is smoothly stored and released and the reactivity with the electrolytic solution decreases. Incidentally, there is also a case in which the tin cobalt carbon-containing material has a phase containing a simple substance or a part of the respective constituent elements in addition to a low crystalline or amorphous phase.

In order to judge whether or not the diffraction peak attained by X-ray diffraction is a diffraction peak corresponding to a reaction phase, it is only required to compare the X-ray diffraction charts attained before and after the electrochemical reaction with lithium to each other. If the position of the diffraction peak changes before and after the electrochemical reaction with lithium, the diffraction peak is a diffraction peak corresponding to a reaction phase. In this case, for example, a diffraction peak of a low crystalline or amorphous reaction phase is detected in a range of 2θ=20° to 50°. It is considered that this reaction phase contains, for example, the series of constituent elements described above and is low crystallized or amorphized mainly by the presence of carbon.

In the tin cobalt carbon-containing material, it is preferable that at least a part of carbon which is a constituent element is bonded to a metal element or a metalloid element which is another constituent element. This is because the aggregation of tin, crystallization of tin, and the like are suppressed.

The bonding state of elements can be confirmed using, for example, X-ray photoelectron spectroscopy (XPS). In a commercially available apparatus, for example, Al-Kα ray or Mg-Kα ray is used as the soft X-ray. In a case in which a part or all of carbon is bonded to a metal element, a metalloid element or the like, the peak of the synthetic wave at the carbon is orbitals (Cis) is detected in a region lower than 284.5 eV. However, it is assumed that the energy calibration is performed so that the peak at the gold atom 4f orbitals (Au4f) is attained at 84.0 eV. In this case, surface-contaminated carbon is usually present on the surface of a substance, and thus the position at which the C1s peak of the surface-contaminated carbon is detected is set to 284.8 eV, and this peak is used as an energy reference. In XPS measurement, the waveform of the C1s peak is attained in a state including the peak attributed to the surface-contaminated carbon and the peak attributed to the carbon in the tin cobalt carbon-containing material. For this reason, for example, by analyzing the peak using commercially available software, the peak attributed to the surface-contaminated carbon and the peak attributed to the carbon in the tin cobalt carbon-containing material are separated from each other. In the analysis of waveform, the position of the main peak present on the lowest bound energy side is used as the energy reference (284.8 eV).

This tin cobalt carbon-containing material is not limited to a material containing only tin, cobalt, and carbon as the constituent elements. This tin cobalt carbon-containing material may contain, for example, any one kind or two or more kinds among silicon, iron, nickel, chromium, indium, niobium, germanium, titanium, molybdenum, aluminum, phosphorus, gallium, bismuth and the like as a constituent element in addition to tin, cobalt, and carbon.

In addition to the tin cobalt carbon-containing material, a tin cobalt iron carbon-containing material is also preferable. This "tin cobalt iron carbon-containing material" is the generic term for materials containing tin, cobalt, iron, and carbon as constituent elements. The composition of this tin cobalt iron carbon-containing material is arbitrary. As an example, in a case in which the iron content is set to be low, the carbon content is 9.9% by mass to 29.7% by mass, the iron content is 0.3% by mass to 5.9% by mass, and the proportion (Co/(Sn+Co)) of tin and cobalt content is 30% by mass to 70% by mass. In addition, in a case in which the iron content is set to be high, the carbon content is 11.9% by mass to 29.7% by mass, the proportion ((Co+Fe)/(Sn+Co+Fe)) of tin, cobalt, and iron content is 26.4% by mass to 48.5% by mass, and the proportion (Co/(Co+Fe)) of cobalt and iron content is 9.9% by mass to 79.5% by mass. This is because a high energy density is attained. Incidentally, the physical properties (half value width and the like) of the tin cobalt iron carbon-containing material are similar to, for example, the physical properties of the tin cobalt carbon-containing material described above.

In addition, the other materials are, for example, a metal oxide and a polymer compound. Examples of the metal oxides include iron oxide, ruthenium oxide, and molybdenum oxide. Examples of the polymer compounds include polyacetylene, polyaniline, and polypyrrole.

Incidentally, the negative electrode active material layer 22B is formed by any one kind or two or more kinds of methods among, for example, a coating method, a vapor phase method, a liquid phase method, a thermal spray method, and a firing method (sintering method).

The coating method is, for example, a method in which the negative electrode current collector 22A is coated with a solution in which a mixture of a negative electrode active material, a negative electrode binder and the like is dissolved or dispersed in an organic solvent and the like.

Examples of the vapor phase method include a physical deposition method and a chemical deposition method. More specific examples of the vapor phase method include a vacuum vapor deposition method, a sputtering method, an ion plating method, a laser ablation method, a thermal chemical vapor deposition method, a chemical vapor deposition (CVD) method, and a plasma chemical vapor deposition method. Examples of the liquid phase method include an electrolytic plating method and an electroless plating method. The thermal spraying method is a method in which a negative electrode active material in molten or semi-molten state is sprayed onto the negative electrode current collector 22A. The firing method is, for example, a method in which a solution is applied to the negative electrode current collector 22A by a coating method and then subjected to a heat treatment at a temperature higher than the melting point of the negative electrode binder and the like. Examples of this firing method include an atmosphere firing method, a reaction firing method, and a hot press firing method.

In this secondary battery, it is preferable that the electrochemical equivalent of the negative electrode material capable of storing and releasing lithium is greater than the electrochemical equivalent of the positive electrode in order to prevent unintentional precipitation of lithium metal on the surface of the negative electrode 22 during charging as described above. In addition, when the open circuit voltage at full charging (namely, battery voltage) is 4.25 V or more, the amount of lithium released per unit mass increases as compared to a case in which the open circuit voltage at full charging is 4.20 V even when the same positive electrode active material is used, and it is thus preferable that the amount of the positive electrode active material and the amount of the negative electrode active material are adjusted in consideration of this. A high energy density is thus attained.

The negative electrode binder contains any one kind or two or more kinds among, for example, synthetic rubber and polymer compounds. Examples of the synthetic rubber include styrene butadiene-based rubber, fluorine-based rubber, and ethylene propylene diene. Examples of the polymer compounds include polyvinylidene fluoride and polyimide.

Among these, it is preferable that the negative electrode binder contains polyvinylidene fluoride. This is because polyvinylidene fluoride exhibits excellent binding property and high physical durability and high chemical durability are attained.

The content of the negative electrode binder in the negative electrode active material layer 22B, namely, the proportion of the weight of the negative electrode binder to the weight of the negative electrode active material layer 22B is not particularly limited but is preferably, for example, 2% by weight to 5% by weight. This is because the binding property is secured while a high battery capacity is maintained.

Specifically, in a case in which the content of the negative electrode binder is less than 2% by weight, the amount of the negative electrode binder is insufficient and the binding property may be thus diminished. On the other hand, in a case in which the content of the negative electrode binder is greater than 5% by weight, the content of the negative electrode binder is relatively too great with respect to the content of the negative electrode active material and thus the battery capacity (the capacity of the negative electrode 22) may excessively decrease.

The weight average molecular weight of polyvinylidene fluoride is not particularly limited, but among others, is preferably 300,000 to 5,000,000. This is because the electric resistance of the negative electrode active material layer 22B is less likely to fluctuate.

In detail, in a case in which the weight average molecular weight is less than 300,000, the negative electrode binder is likely to move to the vicinity of the surface of the negative electrode active material layer 22B in the step (drying step) of forming the negative electrode active material layer 22B to be described later, and thus the electric resistance may be likely to fluctuate in the thickness direction of the negative electrode active material layer 22B. On the other hand, in a case in which the weight average molecular weight is greater than 5,000,000, the dispersibility of the negative electrode binder is diminished in the step of preparing a negative electrode mixture slurry to be described later and thus the electric resistance of the negative electrode active material layer 22B may be likely to fluctuate as a whole.

The negative electrode conductive agent contains any one kind or two or more kinds among, for example, conductive materials such as carbon materials. Examples of these carbon materials include graphite, carbon black, acetylene black, and ketjen black. The shape of the carbon material is not particularly limited but may be any one kind or two or more kinds among, for example, a particulate shape, a flaky shape, and a fibrous shape. However, the positive electrode conductive agent may contain a metal material, a conductive polymer and the like as long as they are conductive materials.

Among others, it is preferable that the negative electrode conductive agent contains a fibrous carbon material and a flaky carbon material. This is because the electric resistance of the entire negative electrode active material layer 22B decreases as well as is less likely to fluctuate.

In detail, the silicon-containing material is less likely to violently expand and contract at the time of charging and discharging and thus is less likely to be pulverized when charging and discharging is repeated as described above. In this case, a decomposition product of the electrolytic solution accumulates on the surface of the pulverized silicon-containing material and thus the conductivity (electron conductivity) may be diminished inside the negative electrode active material layer 22B.

However, when the negative electrode conductive agent contains a fibrous carbon material and a flaky carbon material, the short-distance conductivity is secured by the flaky carbon material as well as the long-distance conductivity is secured by the fibrous carbon material inside the negative electrode active material layer 22B even when the silicon-containing material is pulverized. Hence, the electric resistance of the entire negative electrode active material layer 22B decreases as well as is less likely to fluctuate even when the silicon-containing material is pulverized.

The kind of fibrous carbon material is not particularly limited, but examples thereof include a carbon fiber. In addition, the kind of flaky carbon material is not particularly limited, but examples thereof include flaky graphite and carbon black.

The content of the negative electrode conductive agent in the negative electrode active material layer 22B is not particularly limited. In other words, the content of the fibrous carbon material in the negative electrode active material layer 22B is not particularly limited as well as the content of the flaky carbon material in the negative electrode active material layer 22B is not particularly limited.

Among others, the content of the fibrous carbon material in the negative electrode conductive agent, namely, the proportion of the weight of the fibrous carbon material to the sum of the weight of the fibrous carbon material and the weight of the flaky carbon material is preferably 0.1% by weight to 3.0% by weight.

In addition, the content of the flaky carbon material in the negative electrode conductive agent, namely, the proportion of the weight of the flaky carbon material to the sum of the weight of the fibrous carbon material and the weight of the flaky carbon material is preferably 0.1% by weight to 3.0% by weight. This is because the electric resistance of the entire negative electrode active material layer 22B sufficiently decreases and thus the discharge capacity is less likely to decrease even when charging and discharging is repeated.

In detail, in a case in which the content of the fibrous carbon material is less than 0.1% by weight, the long-distance conductivity is less likely to be secured inside the negative electrode active material layer 22B and thus the electric resistance of the entire negative electrode active material layer 22B may not sufficiently decrease. On the other hand, in a case in which the content of the fibrous carbon material is greater than 3.0% by weight, the fibrous carbon material is less likely to be dispersed in the step of preparing a negative electrode mixture slurry to be described later and thus the electric resistance of the entire negative electrode active material layer 22B may not sufficiently decrease as well as may be likely to fluctuate.

In addition, in a case in which the content of the flaky carbon material is less than 0.1% by weight, the short-distance conductivity is less likely to be secured inside the negative electrode active material layer 22B and thus the electric resistance of the entire negative electrode active material layer 22B may not sufficiently decrease. On the other hand, in a case in which the content of the flaky carbon material is greater than 3.0% by weight, a product by the decomposition reaction of the electrolytic solution is likely to accumulate on the surface of the flaky carbon material due to the large specific surface area of the flaky carbon material and thus the electric resistance of the entire negative electrode active material layer 22B may not sufficiently decrease. Moreover, the negative electrode active material layer 22B may be likely to collapse due to the presence of a great amount of flaky carbon material when the silicon-containing material violently expands and contracts at the time of charging and discharging.

Incidentally, the negative electrode active material layer 22B may further contain any one kind or two or more kinds among other materials. The "other materials" described here are materials other than the negative electrode active material, negative electrode binder, and negative electrode conductive agent described above.

The kind of other material is not particularly limited, but examples thereof include polycarboxylic acid. This is because the binding property of the negative electrode binder is improved when the negative electrode active material layer 22B contains a polycarboxylic acid together with the negative electrode binder. In this case, the binding property of polyvinylidene fluoride is remarkably improved particularly when the negative electrode binder contains polyvinylidene fluoride.

Specifically, examples of the polycarboxylic acid include maleic acid. The content of the polycarboxylic acid in the negative electrode active material layer 22B can be arbitrarily set depending on, for example, the content of the negative electrode binder.

The separator 23 is interposed between the positive electrode 21 and the negative electrode 22, for example, as illustrated in FIG. 2. By this, the separator 23 allows lithium ions to pass through while preventing a short circuit of current due to contact between the positive electrode 21 and the negative electrode 22.

This separator 23 includes, for example, any one kind or two or more kinds among porous films of synthetic resins, ceramics and the like and may be a laminated body of two or more kinds of porous films. Examples of the synthetic resins include polytetrafluoroethylene, polypropylene, and polyethylene.

In particular, the separator 23 may include, for example, the above-described porous film (base material layer) and a polymer compound layer provided on one or both surfaces of the base material layer. This is because the close contact property of the separator 23 with respect to the positive electrode 21 is improved as well as the close contact property of the separator 23 with respect to the negative electrode 22 is improved, and thus the distortion of the wound electrode body 20 is suppressed. By this, the decomposition reaction of the electrolytic solution is suppressed as well as the leakage of the electrolytic solution impregnated in the base material layer is suppressed, and thus the resistance is less likely to increases even when charging and discharging is repeated as well as the secondary battery is less likely to swell.

The polymer compound layer contains, for example, any one kind or two or more kinds among polymer compounds such as polyvinylidene fluoride. This is because a polymer compound has excellent physical strength as well as is electrochemically stable. In the case of forming this polymer compound layer, for example, a solution in which a polymer compound is dissolved in an organic solvent and the like is applied to the base material layer and then the base material layer is dried. Alternatively, the base material layer may be immersed in a solution and then dried, for example.

Incidentally, the polymer compound layer may contain any one kind or two or more kinds among, for example, insulating particles such as inorganic particles. Examples of the kind of inorganic particles include aluminum oxide and aluminum nitride.

The electrolytic solution contains a solvent and an electrolyte salt. However, the electrolytic solution may further contain any one kind or two or more kinds among other materials such as additives.

The solvent contains any one kind or two or more kinds among non-aqueous solvents such as organic solvents. The electrolytic solution containing a non-aqueous solvent is a so-called non-aqueous electrolytic solution.

Examples of the non-aqueous solvent include a cyclic carbonate ester, a chain carbonate ester, a lactone, a chain carboxylate ester, and a nitrile (mononitrile). This is because an excellent battery capacity, excellent cycle characteristics, excellent storage characteristics and the like are attained.

Examples of the cyclic carbonate ester include ethylene carbonate, propylene carbonate, and butylene carbonate. Examples of the chain carbonate ester include dimethyl carbonate, diethyl carbonate, ethyl methyl carbonate, and methyl propyl carbonate. Examples of the lactone include γ-butyrolactone and γ-valerolactone. Examples of the chain carboxylate ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, methoxyacetonitrile, and 3-methoxypropionitrile.

In addition to these, the non-aqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. This is because the same advantages are attained.

Among these, it is preferable that the non-aqueous solvent contains any one kind or two or more kinds among ethylene carbonate, propylene carbonate, dimethyl carbonate, diethyl carbonate, ethyl methyl carbonate and the like. This is because a high battery capacity, excellent cycle characteristics, excellent storage characteristics and the like are attained. In this case, combinations of solvents having a high viscosity (high permittivity) (for example, relative permittivity 30) such as ethylene carbonate and propylene carbonate with solvents having a low viscosity (for example, viscosity≤1 mPa·s) such as dimethyl carbonate, ethyl methyl carbonate, and diethyl carbonate are more preferable. This is because the dissociation property of the electrolyte salt and the mobility of ions are improved.

In addition, examples of the non-aqueous solvent include an unsaturated cyclic carbonate ester, a halogenated carbonate ester, a sulfonate ester, an acid anhydride, a dicyano compound (dinitrile compound), a diisocyanate compound, a phosphate ester, and a chain compound having a carbon-carbon triple bond. This is because the chemical stability of the electrolytic solution is improved.

An unsaturated cyclic carbonate ester is a cyclic carbonate ester having one or two or more unsaturated bonds (carbon-carbon double bonds or carbon-carbon triple bonds). Examples of this unsaturated cyclic carbonate ester include vinylene carbonate, vinyl ethylene carbonate, and methylene ethylene carbonate. The content of the unsaturated cyclic carbonate ester in the non-aqueous solvent is not particularly limited but is, for example, 0.01% by weight to 10% by weight.

A halogenated carbonate ester is are a cyclic or chain carbonate ester containing one or two or more halogen elements as a constituent element. In a case in which the halogenated carbonate ester contains two or more halogens as a constituent element, the kind of the two or more halogens may be only one kind or two or more kinds. Examples of the halogenated cyclic carbonate ester include 4-fluoro-1,3-dioxolan-2-one and 4,5-difluoro-1,3-dioxolan-2-one. Examples of the halogenated chain carbonate ester include fluoromethyl methyl carbonate, bis(fluoromethyl) carbonate, and difluoromethyl methyl carbonate. The content of halogenated carbonate ester in the non-aqueous solvent is not particularly limited and is, for example, 0.01% by weight to 50% by weight.

Examples of the sulfonate ester include a monosulfonate ester and a disulfonate ester. The content of the sulfonate ester in the non-aqueous solvent is not particularly limited and is, for example, 0.01% by weight to 10% by weight.

The monosulfonate ester may be a cyclic monosulfonate ester or a chain monosulfonate ester. Examples of the cyclic monosulfonate ester include sultones such as 1,3-propane sultone and 1,3-propene sultone. Examples of the chain monosulfonate ester include a compound in which a cyclic monosulfonate ester is cleaved in the middle. The disulfonate ester may be a cyclic disulfonate ester or a chain disulfonate ester.

Examples of the acid anhydride include carboxylic anhydrides, disulfonic anhydrides, and carboxylic sulfonic anhydrides. Examples of the carboxylic anhydrides include anhydrous succinic acid, anhydrous glutaric acid, and anhydrous maleic acid. Examples of the disulfonic anhydrides include anhydrous ethanedisulfonic acid and anhydrous propanedisulfonic acid. Examples of the carboxylic sulfonic anhydrides include anhydrous sulfobenzoic acid, anhydrous sulfopropionic acid, and anhydrous sulfobutyric acid. The content of acid anhydride in the non-aqueous solvent is not particularly limited and is, for example, 0.5% by weight to 5% by weight.

A dinitrile compound is, for example, a compound represented by NC—R1-CN (R1 represents either of an alkylene group or an arylene group).

Examples of this dinitrile compound include succinonitrile (NC—$C_2H_4$—CN), glutaronitrile (NC—$C_3H_6$—CN), adiponitrile (NC—$C_4H_8$—CN), and phthalonitrile (NC—$C_6H_4$—CN). The content of dinitrile compound in the non-aqueous solvent is not particularly limited and is, for example, 0.5% by weight to 5% by weight.

A diisocyanate compound is, for example, a compound represented by OCN—R2-NCO (R2 represents either of an alkylene group or an arylene group). Examples of this diisocyanate compound include hexamethylene diisocyanate (OCN—$C_6H_{12}$—NCO). The content of diisocyanate compound in the non-aqueous solvent is not particularly limited and is, for example, 0.5% by weight to 5% by weight.

Examples of the phosphate ester include trimethyl phosphate and triethyl phosphate. The content of the phosphate ester in the non-aqueous solvent is not particularly limited and is, for example, 0.5% by weight to 5% by weight.

A chain compound having a carbon-carbon triple bond is a chain compound having one or two or more carbon-carbon triple bonds (—C≡C—). Examples of this chain compound having a carbon-carbon triple bond include propargyl methyl carbonate (CH≡C—$CH_2$—O—C(=O)—O—$CH_3$) and propargyl methanesulfonate (CH≡C—$CH_2$—O—S(=O)$_2$—$CH_3$). The content of chain compound having a carbon-carbon triple bond in the non-aqueous solvent is not particularly limited and is, for example, 0.5% by weight to 5% by weight.

The electrolyte salt contains, for example, any one kind or two or more kinds among salts such as lithium salts. However, the electrolyte salt may contain, for example, salts other than lithium salts. Examples of the salts other than lithium salts include salts of light metals other than lithium.

Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). This is because an excellent battery capacity, excellent cycle characteristics, excellent storage characteristics, and the like are attained.

Among these, any one kind or two or more kinds among lithium hexafluorophosphate, lithium tetrafluoroborate, lithium perchlorate, and lithium hexafluoroarsenate are preferable and lithium hexafluorophosphate is more preferable. This is because the internal resistance decreases.

The content of electrolyte salt is not particularly limited but, among others, is preferably 0.3 mol/kg to 3.0 mol/kg with respect to the solvent. This is because high ionic conductivity is attained.

Figure 3:
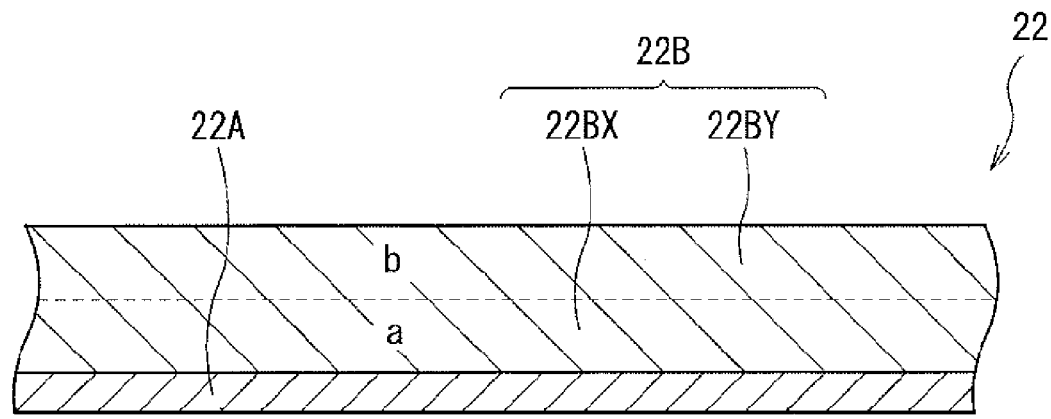
FIG. 3 is an enlarged cross-sectional diagram illustrating a part of the configuration of a negative electrode illustrated in FIG. 2.

Subsequently, the physical properties of the negative electrode 22 will be described. FIG. 3 is an enlarged diagram illustrating a part of the cross-sectional configuration of the negative electrode 22 illustrated in FIG. 2. Incidentally, in FIG. 3, only one of the two negative electrode active material layers 22B illustrated in FIG. 2 is illustrated in order to simplify the illustration.

In this negative electrode 22, in a case in which the negative electrode active material layer 22B contains a carbon-containing material and a silicon-containing material, the physical properties are optimized in order to optimize the electric resistance distribution in the negative electrode active material layer 22B.

This electric resistance distribution in the negative electrode active material layer 22B is mainly the distribution of electric resistance in the negative electrode active material layer 22B due to the electric resistance in the vicinity of the silicon-containing material. The reason why the electric resistance in the vicinity of the silicon-containing material is focused is because the electric resistance in the vicinity of the silicon-containing material greatly affects the electric resistance of the entire negative electrode active material layer 22B since the silicon-containing material has an advantage of having a high theoretical capacity but has a concern of having a higher electric resistance than the carbon-containing material as described above.

Specifically, the spreading resistance distribution a/b in the negative electrode active material layer 22B is 1.03 to 10 as measured using a scanning spreading resistance microscope (SSRM). This is because the electric resistance of the entire anode active material layer 22B stably and sufficiently decreases while a high theoretical capacity is maintained since the electric resistance distribution in the negative electrode active material layer 22B is optimized in a case in which the negative electrode active material layer 22B contains a carbon-containing material and a silicon-containing material as described above. By this, a high energy density is attained as well as the discharge capacity is less likely to decrease even when charging and discharging is repeated.

This "spreading resistance distribution a/b" is a parameter measured using a scanning spreading resistance microscope as described above. Specifically, the spreading resistance distribution a/b is a ratio of the spreading resistance a (Ω) of a lower layer 22BX to the spreading resistance b (Ω) of a upper layer 22BY in a case in which the negative electrode active material layer 22B provided on the negative electrode current collector 22A is divided into two equal parts of the lower layer 22BX (layer on the side closer to the negative electrode current collector 22A) and the upper layer 22BY (layer on the side far from the negative electrode current collector) in the thickness direction as illustrated in FIG. 3. Incidentally, the value at the third decimal place is rounded off in the case of calculating the spreading resistance distribution a/b.

This scanning spreading resistance microscope is an observation instrument that two-dimensionally visualizes the electric resistance distribution in a sample by applying a voltage to the sample and measuring the current flowing through the conductive probe using a wide range logarithmic amplifier.

The kind of scanning spreading resistance microscope to be used in order to measure the spreading resistance distribution a/b is not particularly limited, but examples thereof include a scanning spreading resistance microscope Nano-Navi/E-sweep manufactured by Hitachi High-Tech Science Corporation. The measurement conditions of the spreading resistance distribution a/b are, for example, high spatial resolution=several nm to several tens of nm, detection depth=several nm to several tens of nm, and dynamic range=10 kΩ to 100 GΩ.

This spreading resistance distribution a/b can be changed by, for example, adjusting the particle size distribution (median diameter D50) and average aspect ratio of the carbon-containing material and silicon-containing material. In other words, it is possible to adjust the spreading resistance distribution a/b so as to be in the proper range (=1.03 to 10) described above by changing the grain shape of each of the carbon-containing material and the silicon-containing material.

Incidentally, in a case in which the negative electrode active material layer 22B contains a carbon-containing material and a silicon-containing material, for example, lithium is stored in the negative electrode 22 at the time of charging and thus an alloy ($Li_xSi$) of silicon and lithium is formed in the negative electrode 22 as to be described later. In this case, the value of x that determines the composition of the alloy is considered to be, for example, x=1.8 to 3.2 when the spreading resistance distribution a/b in the negative electrode active material layer 22B is in the proper range (=1.03 to 10).

Subsequently, the operation of the secondary battery will be described. This secondary battery operates, for example, as follows.

At the time of charging, lithium ions are released from the positive electrode 21 as well as the lithium ions are stored in the negative electrode 22 via the electrolytic solution. On the other hand, at the time of discharging, lithium ions are released from the negative electrode 22 as well as the lithium ions are stored in the positive electrode 21 via the electrolytic solution.

The final voltage at the time of discharging is not particularly limited but, among others, is preferably 3.0 V or more and more preferably 3.1 V or more. This is because the spreading resistance distribution a/b is likely to be controlled so as to be in the proper range (=1.03 to 10). In other words, this is because the composition (value of x) of the alloy ($Li_xSi$) to be formed in the negative electrode 22 at the time of charging is likely to be controlled so as to be the proper composition (x=1.8 to 3.2).

Subsequently, the method for manufacturing a secondary battery will be described. This secondary battery is manufactured, for example, according to the following procedure.

In the case of fabricating the positive electrode 21, a positive electrode active material, a positive electrode binder, a positive electrode conductive agent, and the like are first mixed to obtain a positive electrode mixture. Subsequently, the positive electrode mixture is dispersed in an organic solvent and the like to prepare a paste-like positive electrode mixture slurry. Finally, the positive electrode mixture slurry is applied to both surfaces of the positive electrode current collector 21A and then dried to form the positive electrode active material layer 21B. Thereafter, the positive electrode active material layer 21B is compression-molded using a roll press and the like. In this case, the positive electrode active material layer 21B may be heated, or compression molding may be repeated plural times.

In the case of fabricating the negative electrode 22, the negative electrode active material layer 22B is formed on both surfaces of the negative electrode current collector 22A according to the same procedure as the procedure of manufacturing a negative electrode described above. Specifically, a negative electrode active material containing a carbon-containing material and a silicon-containing material is mixed with a negative positive electrode binder, a negative electrode conductive agent and the like to obtain a positive electrode mixture, and then the negative electrode mixture is dispersed in an organic solvent and the like to prepare a paste-like negative electrode mixture slurry. Finally, this negative electrode mixture slurry is applied to both surfaces of the negative electrode current collector 22A and then dried.

In the case of assembling a secondary battery, the positive electrode lead 25 is connected to the positive electrode current collector 21A by a welding method and the like as well as the negative electrode lead 26 is connected to the negative electrode current collector 22A by a welding method and the like. Subsequently, the positive electrode 21 and the negative electrode 22 are stacked with the separator 23 interposed therebetween, and then the positive electrode 21, the negative electrode 22, and the separator 23 are wound to form a wound body. Subsequently, the center pin 24 is inserted into a winding center 20C of the wound body.

Subsequently, the wound body is housed inside the battery can 11 while being sandwiched between the pair of insulating plates 12 and 13. In this case, the positive electrode lead 25 is connected to the safety valve mechanism 15 by a welding method and the like as well as the negative electrode lead 26 is connected to the battery can 11 by a welding method and the like. Subsequently, the electrolytic solution is injected into the battery can 11. By this, the wound body is impregnated with the electrolytic solution, and the wound electrode body 20 is thus formed. Finally, the battery lid 14, the safety valve mechanism 15, and the heat sensitive resistance element 16 are crimped to the opening end portion of the battery can 11 with the gasket 17 interposed therebetween.

By this, the wound electrode body 20 is enclosed inside the battery can 11, and a cylindrical type secondary battery is thus completed.

According to this cylindrical type secondary battery, the negative electrode active material layer 22B contains a carbon-containing material and a silicon-containing material as a negative electrode active material and the spreading resistance distribution a/b in the negative electrode active material layer 22B is 1.03 to 10 as measured using a scanning spreading resistance microscope. In this case, the electric resistance of the entire anode active material layer 22B stably and sufficiently decreases while a high theoretical capacity is maintained since the electric resistance distribution in the negative electrode active material layer 22B is optimized in a case in which a carbon-containing material and a silicon-containing material are concurrently used as described above. Consequently, a high energy density is attained as well as the discharge capacity is less likely to decrease even when charging and discharging is repeated, and thus excellent battery characteristics can be attained.

In particular, if the 10% particle diameter D10 of the plurality of particulate silicon-containing materials is 1 μm to 5 μm and the particle diameter ratio is 0.1 to 0.5, the electric resistance of the entire negative electrode active material layer 22B stably and sufficiently decreases while the binding property of the plurality of particulate carbon-containing materials and the binding property of the plurality of particulate silicon-containing materials are secured, and thus a higher effect can be attained.

In addition, if the average aspect ratio of the plurality of particulate carbon-containing materials is 1.1 to 2.0, the electric resistance of the negative electrode active material layer 22B is less likely to fluctuate while the dispersion stability and structural stability of the plurality of particulate carbon-containing materials are maintained, and thus a higher effect can be attained.

Moreover, if the active material proportion is 30% by weight or less, the suppression of expansion and contraction of the negative electrode active material at the time of charging and discharging and the securing of a high theoretical capacity are both achieved, and thus a higher effect can be attained.

Moreover, if the negative electrode conductive agent contains a fibrous carbon material and a flaky carbon material, the electric resistance of the entire negative electrode active material layer 22B decreases as well as is less likely to fluctuate, and thus a higher effect can be attained. In this case, if the content of the fibrous carbon material in the negative electrode conductive agent is 0.1% by weight to 3.0% by weight as well as the content of the flaky carbon material in the negative electrode conductive agent is 0.1% by weight to 3.0% by weight, the discharge capacity is less likely to decrease even when charging and discharging is repeated as the electric resistance of the entire negative electrode active material layer 22B sufficiently decreases, and thus a still higher effect can be attained.

Moreover, if the negative electrode binder contains polyvinylidene fluoride, excellent binding property is attained as well as high physical durability and high chemical durability are attained, and thus a higher effect can be attained. In this case, if the content of the negative electrode binder in the negative electrode active material layer is 2% by weight to 5% by weight, binding property is secured while a high battery capacity is maintained, and thus a still higher effect can be attained.

Moreover, if the weight average molecular weight of polyvinylidene fluoride is 300,000 to 5,000,000, the electric resistance of the negative electrode active material layer 22B is less likely to fluctuate, and thus a still higher effect can be attained.

Moreover, if the negative electrode active material layer 22B contains a polycarboxylic acid, more specifically maleic acid or the like, the binding property of the negative electrode binder is improved, and thus a higher effect can be attained.

Next, another secondary battery according to an embodiment of the present technology will be described. In the following description, the constituent elements of the cylindrical type secondary battery already described are referred to as needed.

Figure 4:
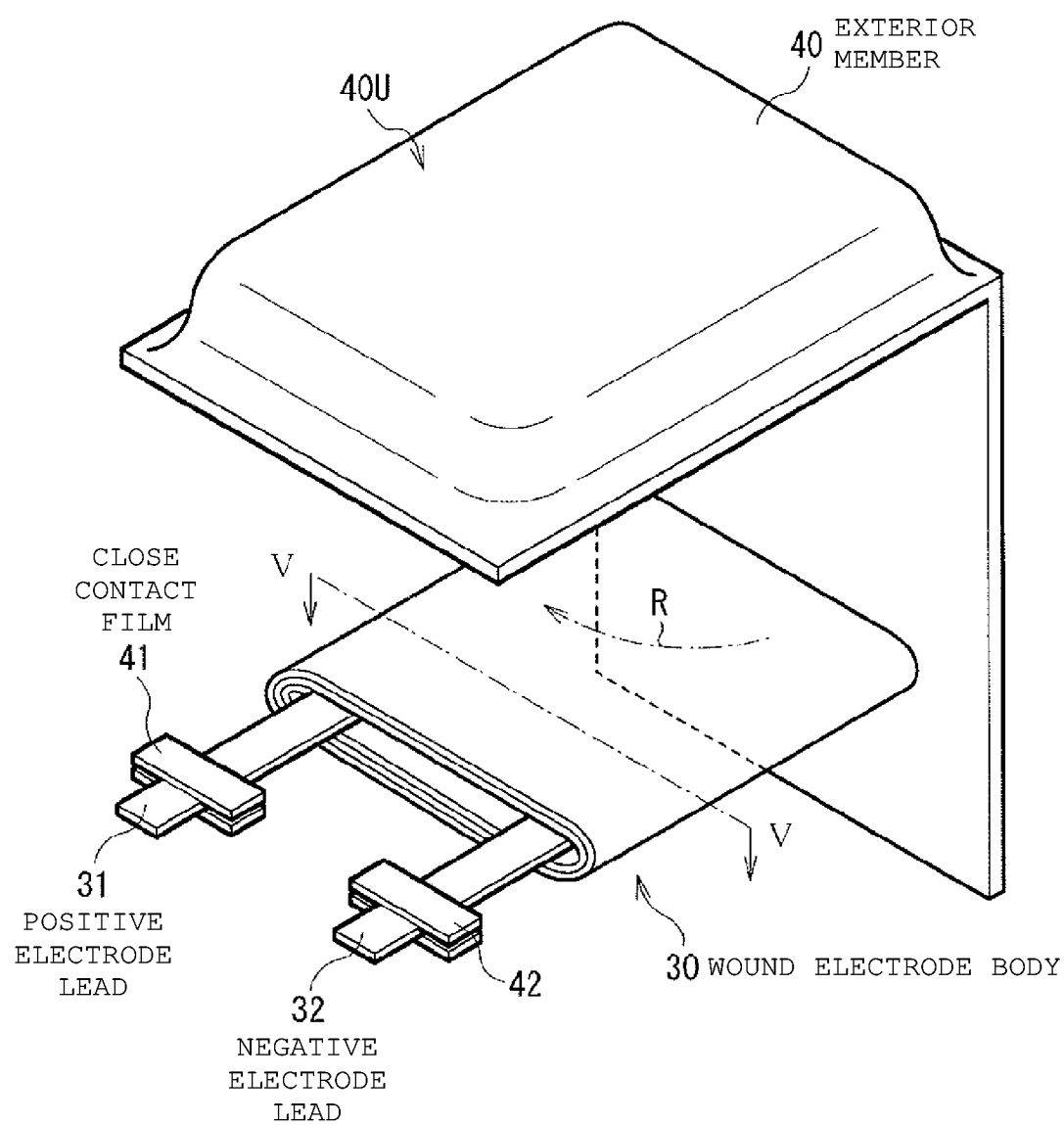
FIG. 4 is a perspective diagram illustrating the configuration of another secondary battery (laminated film type) according to an embodiment of the present technology.
Figure 5:
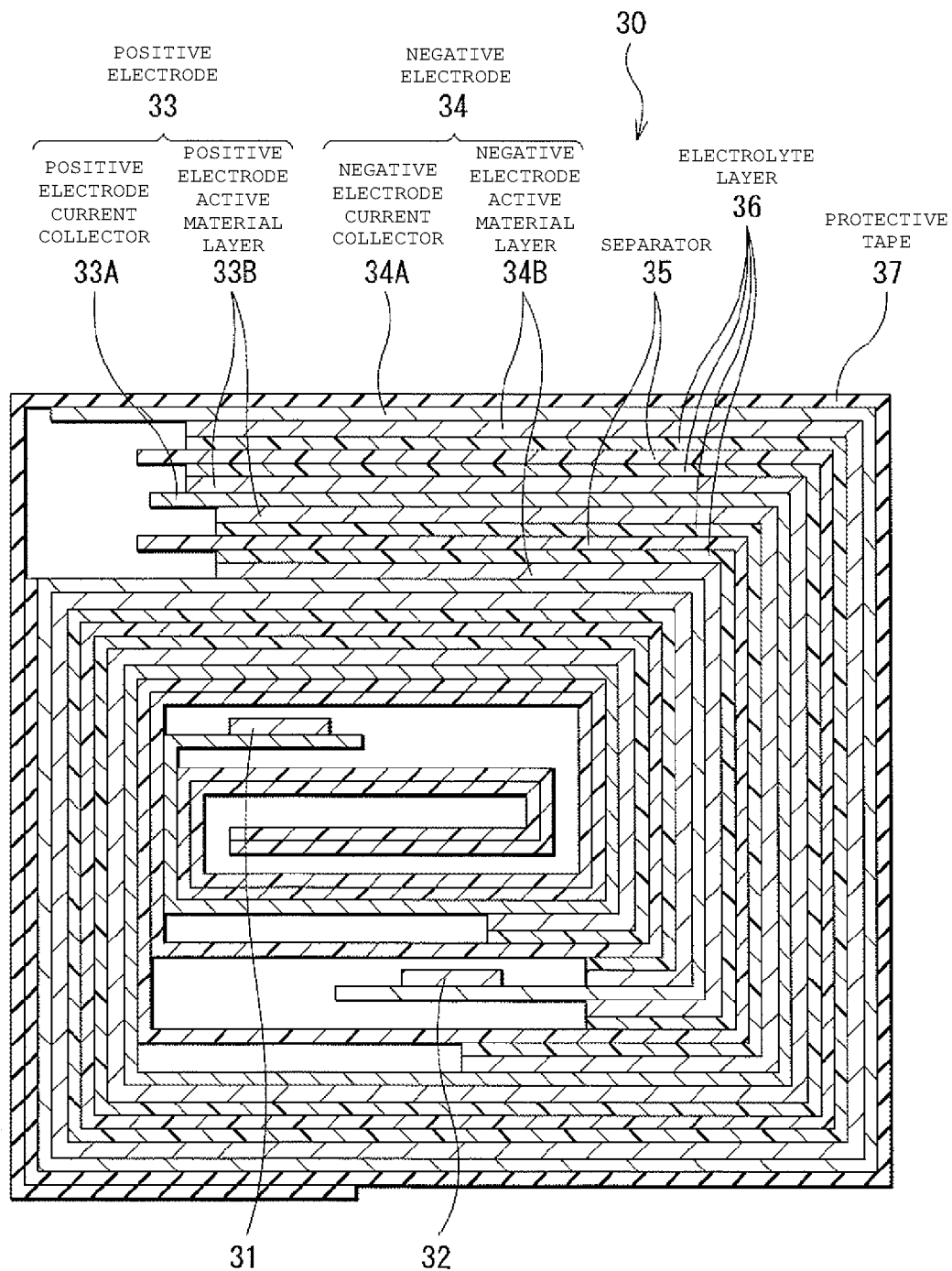
FIG. 5 is a cross-sectional diagram illustrating the configuration of a wound electrode body taken along the line IV-IV illustrated in FIG. 4.

FIG. 4 illustrates a perspective configuration of another secondary battery, and FIG. 5 illustrates an enlarged cross-sectional configuration of the wound electrode body 30 taken along the line V-V illustrated in FIG. 4. Incidentally, a state in which the wound electrode body 30 and an exterior member 40 are distant from each other is illustrated in FIG. 4.

This secondary battery is a laminated film type secondary battery in which the wound electrode body 30 which is a battery element is housed inside the film-shaped exterior member 40 exhibiting flexibility (or plasticity), for example, as illustrated in FIG. 4.

The exterior member 40 is one sheet of film capable of being folded in the direction of the arrow R and a part of the exterior member 40 is provided with a hollow 40U for housing the wound electrode body 30, for example, as illustrated in FIG. 4.

This exterior member 40 is, for example, a laminated film in which a fusion layer, a metal layer, and a surface protective layer are laminated in this order. In the manufacturing process of the secondary battery, the exterior member 40 is folded so that the fusion layers face each other with the wound electrode body 30 interposed therebetween and then the peripheral edge portions of the fusion layers are fused to each other, for example, as to be described later.

The fusion layer includes, for example, any one kind or two or more kinds among films of polyethylene, polypropylene and the like. The metal layer includes, for example, any one kind or two or more kinds among metal foils such as an aluminum foil. The surface protective layer includes, for example, any one kind or two or more kinds among films of nylon, polyethylene terephthalate and the like.

Among these, the exterior member 40 is preferably an aluminum laminated film in which a polyethylene film, an aluminum foil, and a nylon film are laminated in this order.

However, the exterior member 40 may be, for example, a laminated film having another laminated structure, a single-layer polymer film of polypropylene or the like, or a single-layer metal foil of aluminum or the like. Moreover, the exterior member 40 is, for example, two sheets of films, and the two sheets of films may be pasted to each other with an adhesive interposed therebetween, for example.

The wound electrode body 30 is formed as a positive electrode 33 and a negative electrode 34 are stacked with a separator 35 and an electrolyte layer 36 interposed therebetween and then the positive electrode 33, the negative electrode 34, the separator 35, and the electrolyte layer 36 are wound, for example, as illustrated in FIGS. 4 and 5. Incidentally, the outermost peripheral portion of the wound electrode body 30 is protected by a protective tape 37, for example.

A positive electrode lead 31 is connected to the positive electrode 33, and the positive electrode lead 31 is led out from the inside to the outside of the exterior member 40. This positive electrode lead 31 contains any one kind or two or more kinds among, for example, conductive materials such as aluminum. The shape of the positive electrode lead 31 is, for example, a thin plate shape or a mesh shape.

A negative electrode lead 32 is connected to the negative electrode 34, and the negative electrode lead 32 is led out from the inside to the outside of the exterior member 40. The lead-out direction of the negative electrode lead 32 is, for example, the same as the lead-out direction of the positive electrode lead 31. This negative electrode lead 32 contains any one kind or two or more kinds among, for example, conductive materials such as copper, nickel, and stainless steel. The shape of the negative electrode lead 32 is, for example, the same as the shape of the positive electrode lead 31.

For example, a close contact film 41 is inserted between the exterior member 40 and the positive electrode lead 31 in order to prevent intrusion of outside air. This close contact film 41 contains any one kind or two or more kinds among, for example, materials exhibiting close contact property with respect to the positive electrode lead 31 and more specifically contains a polyolefin resin and the like. This polyolefin resin is any one kind or two or more kinds among, for example, polyethylene, polypropylene, modified polyethylene, and modified polypropylene.

For example, a close contact film 42 having a function the same as that of the close contact film 41 is inserted between the exterior member 40 and the negative electrode lead 32. The material for forming the close contact film 42 is, for example, the same as the material for forming the close contact film 41.

The positive electrode 33 includes, for example, a positive electrode current collector 33A and a positive electrode active material layer 33B as well as the negative electrode 34 includes, for example, a negative electrode current collector 34A and a negative electrode active material layer 34B. The configurations of the positive electrode current collector 33A, positive electrode active material layer 33B, negative electrode current collector 34A, and negative electrode active material layer 34B are, for example, similar to the configurations of the positive electrode current collector 21A, the positive electrode active material layer 21B, negative electrode current collector 22A, and negative electrode active material layer 22B. The configuration of the separator 35 is, for example, similar to the configuration of the separator 23.

In other words, the negative electrode active material layer 33B of the negative electrode 33 contains a carbon-containing material and a silicon-containing material and the physical properties (spreading resistance distribution a/b) of the negative electrode active material layer 33B are optimized.

The electrolyte layer 36 contains an electrolytic solution and a polymer compound. The composition of this electrolytic solution is, for example, similar to the composition of the electrolytic solution to be used in the cylindrical type secondary battery.

The electrolyte layer 36 to be described here is a so-called gel-like electrolyte, and the electrolytic solution is retained by the polymer compound in the electrolyte layer 36. This is because high ionic conductivity (for example, 1 mS/cm or more at room temperature) is attained as well as leakage of the electrolytic solution is prevented. Incidentally, the electrolyte layer 36 may further contain any one kind or two or more kinds among other materials such as additives.

The polymer compound contains any one kind or two or more kinds among homopolymers, copolymers and the like. Examples of the homopolymers include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Examples of the copolymers include a copolymer of vinylidene fluoride and hexafluoropyrene. Among these, the homopolymer is preferably polyvinylidene fluoride as well as the copolymer is preferably a copolymer of vinylidene fluoride and hexafluoropyrene. This is because these are electrochemically stable.

In the electrolyte layer 36 which is a gel-like electrolyte, the "solvent" contained in the electrolytic solution is a broad concept including not only a liquid material but also a material exhibiting ion conductivity capable of dissociating an electrolyte salt. For this reason, in the case of using a polymer compound exhibiting ion conductivity, the polymer compound is also included in the solvent.

Incidentally, an electrolytic solution may be used instead of the electrolyte layer 36. In this case, the wound electrode body 30 (the positive electrode 33, the negative electrode 34, and the separator 35) is impregnated with the electrolytic solution.

This secondary battery operates, for example, as follows.

At the time of charging, lithium ions are released from the positive electrode 33 as well as the lithium ions are stored in the negative electrode 34 via the electrolyte layer 36. On the other hand, at the time of discharging, lithium ions are released from the negative electrode 34 as well as the lithium ions are stored in the positive electrode 33 via the electrolyte layer 36.

The secondary battery including the gel-like electrolyte layer 36 is manufactured, for example, according to the following three kinds of procedures.

First, the positive electrode 33 is fabricated according to a procedure similar to the procedure for fabricating the positive electrode 21 as well as the negative electrode 34 is fabricated according to a procedure similar to the procedure for fabricating the negative electrode 22. Specifically, two positive electrode active material layers 33B are formed on both surfaces of the positive electrode current collector 33A in the case of fabricating the positive electrode 33 as well as two negative electrode active material layers 34B are formed on both surfaces of the negative electrode current collector 34A in the case of fabricating the negative electrode 34.

Subsequently, a precursor solution is prepared by mixing an electrolytic solution, a polymer compound, an organic solvent and the like together and then stirring the mixture. Subsequently, the precursor solution is applied to the positive electrode 33 and then dried to form the gel-like electrolyte layer 36. In addition, the precursor solution is applied to the negative electrode 34 and then dried to form the gel-like electrolyte layer 36.

Subsequently, the positive electrode lead 31 is connected to the positive electrode current collector 33A by a welding method and the like as well as the negative electrode lead 32 is connected to the negative electrode current collector 34A by a welding method and the like. Subsequently, the positive electrode 33 and the negative electrode 34 are wound with the separator 35 and the electrolyte layer 36 interposed therebetween and then the positive electrode 33, the negative electrode 34, the separator 35, and the electrolyte layer 36 are wound to form the wound electrode body 30. Thereafter, the protective tape 37 is pasted to the outermost peripheral portion of the wound electrode body 30.

Finally, the exterior member 40 is folded so as to sandwich the wound electrode body 30 therebetween and then the peripheral edge portions of the exterior member 40 are fused to each other by a heat seal method and the like to encapsulate the wound electrode body 30 inside the exterior member 40. In this case, the close contact film 41 is inserted between the positive electrode lead 31 and the exterior member 40 as well as the close contact film 42 is inserted between the negative electrode lead 32 and the exterior member 40.

First, each of the positive electrode 33 and the negative electrode 34 is fabricated according to a procedure similar to the first procedure described above, and then the positive electrode lead 31 is connected to the positive electrode 33 by a welding method and the like as well as the negative electrode lead 32 is connected to the negative electrode 34 by a welding method and the like. Subsequently, the positive electrode 33 and the negative electrode 34 are stacked with the separator 35 interposed therebetween, and then the positive electrode 33, the negative electrode 34, and the separator 35 are wound to fabricate a wound body which is a precursor of the wound electrode body 30. Thereafter, the protective tape 37 is pasted to the outermost peripheral portion of the wound body.

Subsequently, the exterior member 40 is folded so as to sandwich the wound electrode body 30 therebetween and then the remaining peripheral edge portions of the exterior member 40 excluding the peripheral edge portion on one side are fused to each other by a heat seal method and the like to house the wound body inside the bag-shaped exterior member 40.

Subsequently, an electrolyte composition is prepared by mixing an electrolytic solution, a monomer which is a raw material of a polymer compound, a polymerization initiator, and, if necessary, other materials such as a polymerization inhibitor together and then stirring the mixture. Subsequently, the electrolyte composition is injected into the bag-shaped exterior member 40, and then the exterior member 40 is sealed by a heat seal method and the like.

Finally, a polymer compound is formed by thermally polymerizing the monomer in the electrolyte composition. By this, the electrolytic solution is retained by the polymer compound, and the gel-like electrolyte layer 36 is thus formed.

First, a wound body is fabricated according to a procedure similar to the second procedure described above except that the separator 35 is used in which two polymer compound layers are formed on both surfaces of a porous membrane (base material layer). Subsequently, the wound body is housed inside the bag-shaped exterior member 40. Subsequently, the electrolytic solution is injected into the exterior member 40, and then the opening portion of the exterior member 40 is sealed by a heat seal method and the like. Subsequently, the separator 35 is brought into close contact with the positive electrode 33 with the polymer compound layer interposed therebetween as well as the separator 35 is brought into close contact with the negative electrode 34 with the polymer compound layer interposed therebetween by heating the exterior member 40 while applying a load to the exterior member 40. By this, the polymer compound layers are impregnated with the electrolytic solution as well as gelate, and the electrolyte layer 36 is thus formed.

In this third procedure, the secondary battery is less likely to swell as compared to that in the first procedure. Moreover, the solvent and the monomer (raw material of polymer compound) and the like are less likely to remain in the electrolyte layer 36 in the third procedure as compared to the second procedure, and thus the step of forming a polymer compound is favorably controlled. By this, each of the positive electrode 33, the negative electrode 34, and the separator 35 is brought into sufficiently close contact with the electrolyte layer 36.

According to this laminated film type secondary battery, the negative electrode 34 has a configuration similar to that of the negative electrode 22. In this case, for the same reason as in the cylindrical type secondary battery, the electric resistance distribution in the negative electrode active material layer 22B is optimized in a case in which a carbon-containing material and a silicon-containing material are concurrently used, and thus a high energy density is attained as well as the discharge capacity is less likely to decrease even when charging and discharging is repeated. Consequently, excellent battery characteristics can be attained.

The operations and effects other than these of the laminated film type secondary battery are similar to the operations and effects of the cylindrical type lithium ion secondary battery.

Next, application examples of the above-described secondary batteries will be described.

The applications of the secondary batteries are not particularly limited as long as these are machines, devices, instruments, apparatuses, and systems (an assembly of a plurality of devices) which can utilize the secondary batteries as a power source for driving or an electric power storage source for storing electric power. The secondary battery to be used as a power source may be a main power source or an auxiliary power source. The main power source is a power source to be preferentially used regardless of the presence or absence of other power sources. The auxiliary power source may be, for example, a power source to be used instead of the main power source or a power source which can be switched from the main power source, if necessary. In the case of using the secondary batteries as an auxiliary power source, the kind of main power source is not limited to secondary batteries.

The applications of the secondary batteries are, for example, as follows. Electronic devices (including portable electronic devices) such as video cameras, digital still cameras, mobile phones, notebook computers, cordless phones, headphone stereos, portable radios, portable televisions, and portable information terminals. Portable daily appliances such as electric shavers. Memory apparatuses such as backup power sources and memory cards. Electric tools such as electric drills and electric saws. Battery packs to be mounted on notebook computers and the like as a detachable power source. Medical electronic devices such as pacemakers and hearing aids. Electrically driven vehicles such as electric vehicles (including hybrid vehicles). Electric power storage systems such as household battery systems which store electric power in case of an emergency. Of course, the applications of the secondary batteries may be applications other than those mentioned above.

Among these, it is effective that the secondary batteries are applied to a battery pack, an electrically driven vehicle, an electric power storage system, an electric tool, an electronic device, and the like. This is because excellent battery characteristics are required for these applications and thus the performance can be effectively improved by use of the secondary batteries of the present technology. Incidentally, a battery pack is a power source including a secondary battery. A single battery or an assembled battery may be used in this battery pack as to be described later. An electrically driven vehicle is a vehicle which operates (travels) using a secondary battery as a power source for driving and may be a motor vehicle (a hybrid vehicle or the like) provided with a driving source in addition to a secondary battery as described above. The electric power storage system is a system which uses a secondary battery as a power storage source. For example, in a household electric power storage system, electric power is accumulated in a secondary battery which is an electric power storage source and household electric appliances and the like can be thus used by utilizing the electric power. An electric tool is a tool in which a moving unit (for example, a drill) moves using a secondary battery as a power source for driving. An electronic device is a device which performs various functions using a secondary battery as a power source for driving (power supply source).

Here, several application examples of the secondary batteries will be specifically described. Incidentally, the configurations of the application examples to be described below are an example to the utmost and thus the configurations of the application examples can be appropriately changed.

Figure 6:
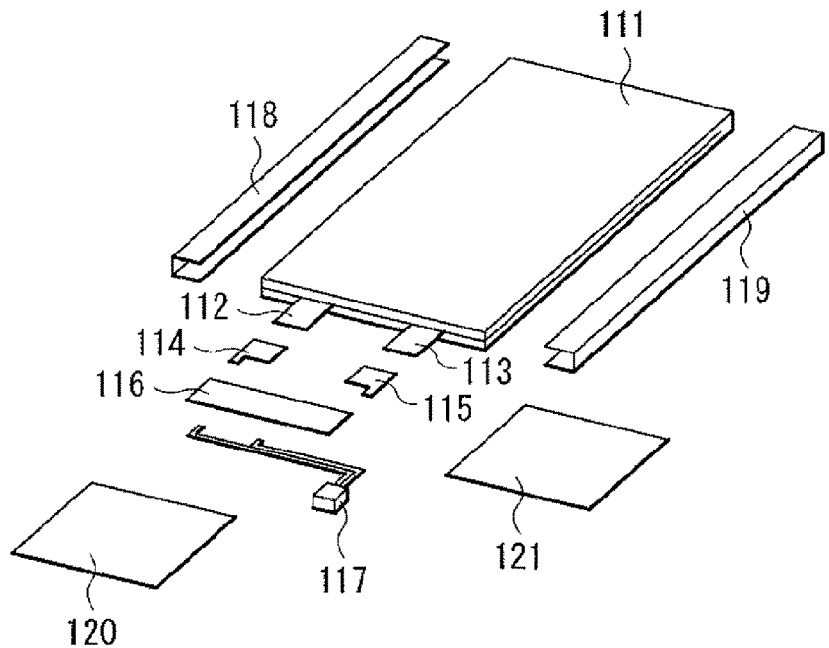
FIG. 6 is a perspective diagram illustrating the configuration of an application example (battery pack: single battery) of a secondary battery according to an embodiment of the present technology.
Figure 7:
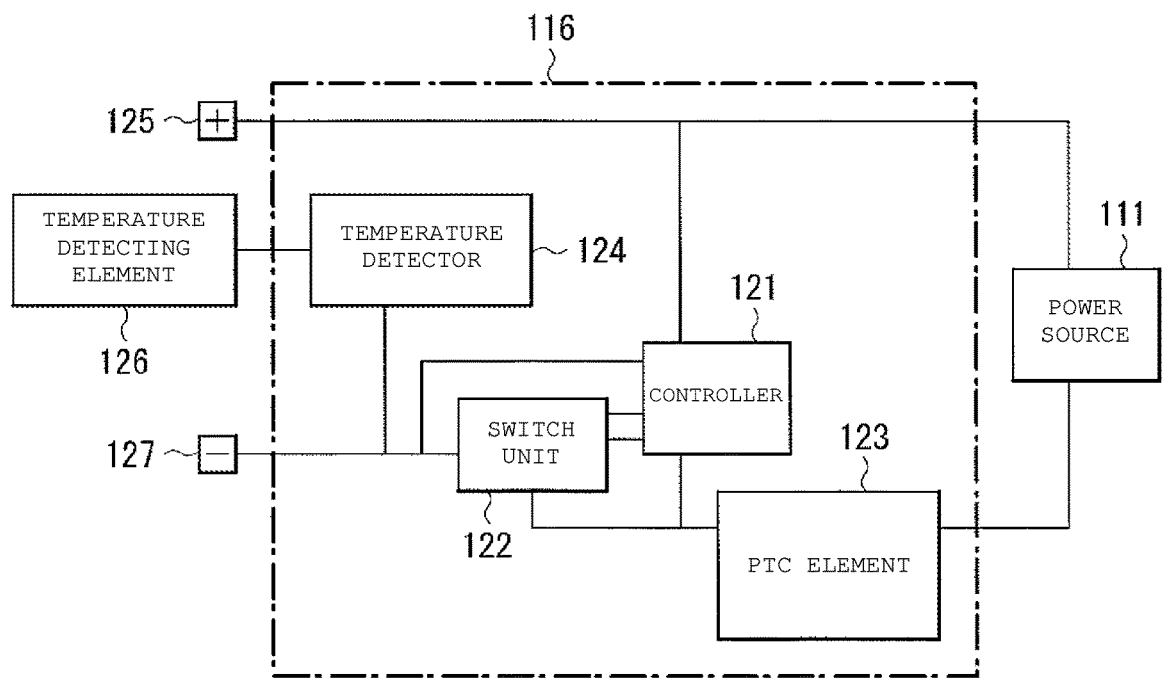
FIG. 7 is a block diagram illustrating the configuration of a battery pack illustrated in FIG. 6.

FIG. 6 illustrates a perspective configuration of a battery pack including a single battery. FIG. 7 illustrates a block configuration of the battery pack illustrated in FIG. 6. Incidentally, a state in which the battery pack is disassembled is illustrated in FIG. 6.

The battery pack to be described here is a simple battery pack (so-called soft pack) including one secondary battery and is mounted on, for example, an electronic device typified by a smartphone. This battery pack includes a power source 111 which is a laminated film type secondary battery, and a circuit board 116 to be connected to the power source 111, for example, as illustrated in FIG. 6. A positive electrode lead 112 and a negative electrode lead 113 are attached to this power source 111.

A pair of adhesive tapes 118 and 119 are pasted to both side surfaces of the power source 111. A protection circuit module (PCM) is formed on the circuit board 116. This circuit board 116 is connected to the positive electrode 112 via a tab 114 as well as connected to the negative electrode lead 113 via a tab 115. In addition, the circuit board 116 is connected to a lead wire 117 with a connector for external connection. Incidentally, in a state in which the circuit board 116 is connected to the power source 111, the circuit board 116 is protected by a label 120 and an insulating sheet 121. As this label 120 is pasted, the circuit board 116, the insulating sheet 121 and the like are fixed.

Moreover, the battery pack includes the power source 111 and the circuit board 116, for example, as illustrated in FIG. 7. The circuit board 116 includes, for example, a controller 121, a switch unit 122, a PTC element 123, and a temperature detector 124. The power source 111 can be connected to the outside via a positive terminal 125 and a negative terminal 127 and thus is charged and discharged through the positive terminal 125 and the negative terminal 127. The temperature detector 124 detects the temperature using a temperature detecting terminal (so-called T terminal) 126.

The controller 121 controls the operation (including the usage state of the power source 111) of the entire battery pack. This controller 121 includes, for example, a central processing unit (CPU) and a memory.

This controller 121 cuts off the switch unit 122 so that the charging current does not flow in the current path of the power source 111, for example, when the battery voltage reaches the overcharge detection voltage. In addition, the controller 121 blocks the charging current by cutting off the switch unit 122, for example, when a large current flows at the time of charging.

On the other hand, the controller 121 cuts off the switch unit 122 so that the discharging current does not flow in the current path of the power source 111, for example, when the battery voltage reaches the overdischarge detection voltage. In addition, the controller 121 blocks the discharging current by cutting off the switch unit 122, for example, when a large current flows at the time of discharging.

Incidentally, the overcharge detection voltage is not particularly limited and is, for example, 4.2 V±0.05 V as well as the overdischarge detection voltage is not particularly limited and is, for example, 2.4 V±0.1 V.

The switch unit 122 switches the usage state of the power source 111, namely, the connection state of the power source 111 to an external device in accordance with the instruction from the controller 121. This switch unit 122 includes, for example, a charging control switch and a discharging control switch. Each of the charging control switch and the discharging control switch is, for example, a semiconductor switch such as a metal oxide semiconductor field effect transistor (MOSFET). Incidentally, the charging and discharging current is detected based on, for example, the ON resistance of the switch unit 122.

The temperature detector 124 measures the temperature of the power source 111 as well as outputs the measurement result of temperature to the controller 121. This temperature detector 124 includes, for example, a temperature detecting element such as a thermistor. Incidentally, the measurement result of temperature to be measured by the temperature detector 124 is used in a case in which the controller 121 performs charging and discharging control at the time of abnormal heat generation, a case in which the controller 121 performs correction processing when calculating the remaining capacity, and the like.

Incidentally, the circuit board 116 may not include the PTC element 123. In this case, a PTC element may be separately installed in the circuit board 116.

Figure 8:
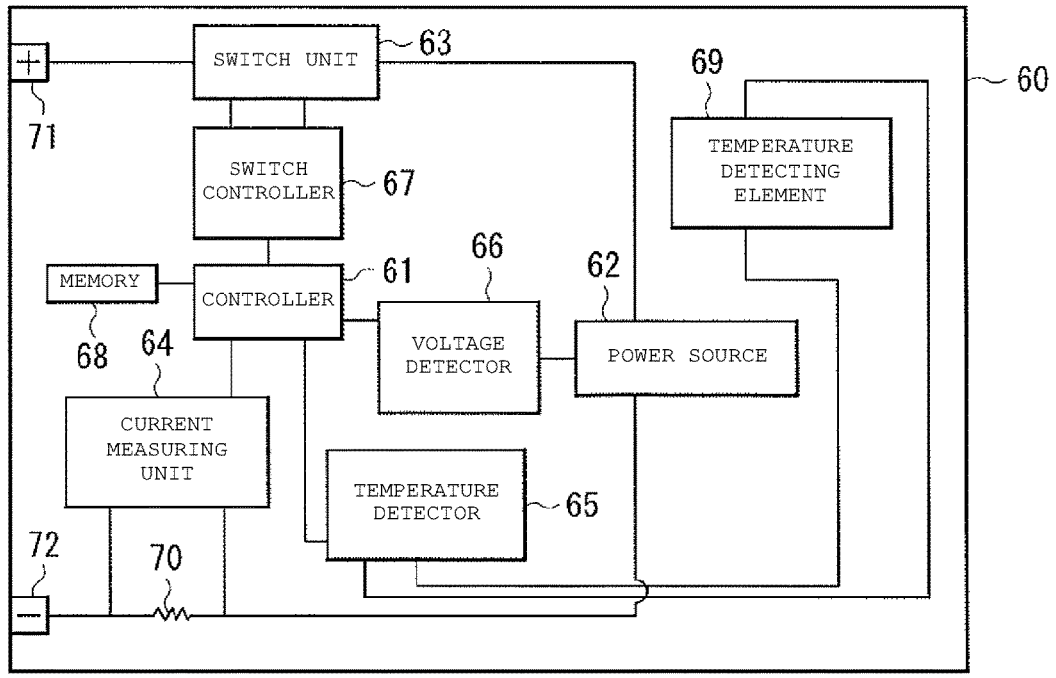
FIG. 8 is a block diagram illustrating the configuration of an application example (battery pack: assembled battery) of a secondary battery according to an embodiment of the present technology.

FIG. 8 illustrates a block configuration of a battery pack including an assembled battery.

This battery pack includes, for example, a controller 61, a power source 62, a switch unit 63, a current measuring unit 64, a temperature detector 65, a voltage detector 66, a switch controller 67, a memory 68, a temperature detecting element 69, a current detecting resistor 70, a positive terminal 71, and a negative terminal 72 inside a housing 60. This housing 60 contains, for example, a plastic material.

The controller 61 controls the operation (including the usage state of the power source 62) of the entire battery pack. This controller 61 includes, for example, a CPU. The power source 62 is an assembled battery including two or more secondary batteries, and the connection form of the two or more secondary batteries may be series connection, parallel connection, or a mixed form of these. As an example, the power source 62 includes six secondary batteries of which two are connected in parallel and three are connected in series.

The switch unit 63 switches the usage state of the power source 62, namely, the connection state of the power source 62 to an external device in accordance with the instruction from the controller 61. This switch unit 63 includes, for example, a charging control switch, a discharging control switch, a charging diode, and a discharging diode. Each of the charging control switch and the discharging control switch is, for example, a semiconductor switch such as a metal oxide semiconductor field effect transistor (MOSFET).

The current measuring unit 64 measures the current using the current detecting resistor 70 as well as outputs the measurement result of current to the controller 61. The temperature detector 65 measures the temperature using the temperature detecting element 69 as well as outputs the measurement result of temperature to the controller 61. This measurement result of temperature is used in a case in which the controller 61 performs charging and discharging control at the time of abnormal heat generation, a case in which the controller 61 performs correction processing when calculating the remaining capacity, and the like. The voltage detector 66 measures the voltage of the secondary battery in the power source 62 as well as supplies the analog-digital converted measurement result of voltage to the controller 61.

The switch controller 67 controls the operation of the switch unit 63 in accordance with the signals input from the current measuring unit 64 and the voltage detector 66, respectively.

This switch controller 67 cuts off the switch unit 63 (charging control switch) so that the charging current does not flow in the current path of the power source 62, for example, when the battery voltage reaches the overcharge detection voltage. By this, in the power source 62, only discharging is possible through the discharging diode. Incidentally, the switch controller 67 blocks the charging current, for example, when a large current flows at the time of charging.

In addition, the switch controller 67 cuts off the switch unit 63 (discharging control switch) so that the discharging current does not flow in the current path of the power source 62, for example, when the battery voltage reaches the overdischarge detection voltage. By this, in the power source 62, only charging is possible through the charging diode. Incidentally, the switch controller 67 blocks the discharging current, for example, when a large current flows at the time of discharging.

Incidentally, the overcharge detection voltage is not particularly limited and is, for example, 4.2 V±0.05 V as well as the overdischarge detection voltage is not particularly limited and is, for example, 2.4 V±0.1 V.

The memory 68 includes, for example, an EEPROM which is a nonvolatile memory. In this memory 68, for example, numerical values calculated by the controller 61, the information (for example, internal resistance in the initial state) on the secondary battery measured at the manufacturing process stage, and the like are memorized. Incidentally, the controller 61 can grasp information such as the remaining capacity when the full charging capacity of the secondary battery is memorized in the memory 68.

The temperature detecting element 69 measures the temperature of the power source 62 and outputs the measurement result of temperature to the controller 61. This temperature detecting element 69 includes, for example, a thermistor.

Each of the positive terminal 71 and the negative terminal 72 is a terminal to be connected to an external device (for example, a notebook personal computer) which works using a battery pack, an external device (for example, a charger) which is used to charge a battery pack, and the like. The power source 62 is charged and discharged through the positive terminal 71 and the negative terminal 72.

Figure 9:
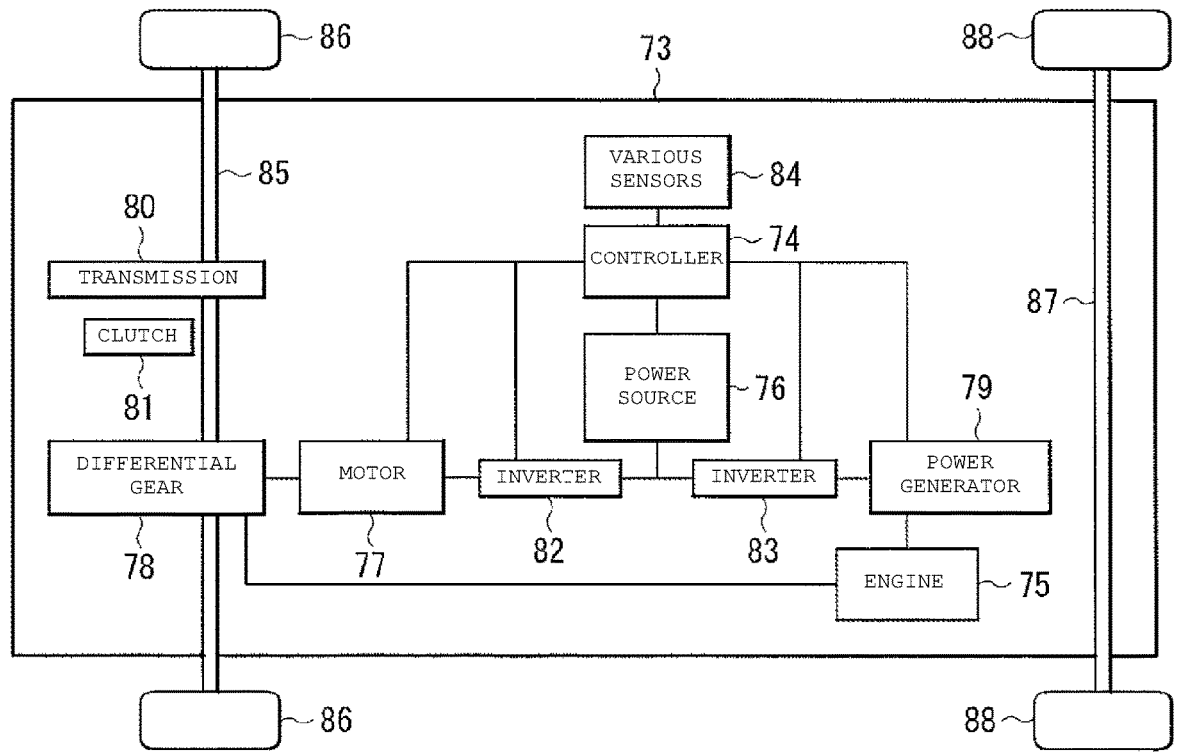
FIG. 9 is a block diagram illustrating the configuration of an application example (electrically driven vehicle) of a secondary battery according to an embodiment of the present technology.

FIG. 9 illustrates a block configuration of a hybrid vehicle which is an example of an electrically driven vehicle.

This electrically driven vehicle includes, for example, a controller 74, an engine 75, a power source 76, a driving motor 77, a differential gear 78, a power generator 79, a transmission 80 and a clutch 81, inverters 82 and 83, and various sensors 84 inside a metal housing 73. In addition to these, the electrically driven vehicle includes, for example, a front wheel drive shaft 85 connected to the differential gear 78 and the transmission 80, a front wheel 86, a rear wheel drive shaft 87, and a rear wheel 88.

This electrically driven vehicle can travel using, for example, either of the engine 75 or the motor 77 as a driving source. The engine 75 is a main power source, and examples thereof include a gasoline engine. In the case of using the engine 75 as a power source, for example, the driving force (turning force) of the engine 75 is transmitted to the front wheels 86 and the rear wheels 88 via the differential gear 78, the transmission 80, and the clutch 81 which are driving units (driver). Incidentally, the turning force of the engine 75 is transmitted to the power generator 79, thus the power generator 79 generates alternating current power utilizing the turning force as well as the alternating current power is converted into direct current power by the inverter 83, and the direct current power is thus accumulated in the power source 76. Meanwhile, in the case of using the motor 77 which is a converter as a power source, the electric power (direct current power) supplied from the power source 76 is converted into alternating current power by the inverter 82, and thus the motor 77 is driven utilizing the alternating current power. The driving force (turning force) converted from electric power by this motor 77 is transmitted to the front wheels 86 and the rear wheels 88, for example, via the differential gear 78, the transmission 80, and the clutch 81 which are driving units (driver).

Incidentally, when the electrically driven vehicle is decelerated by the brake mechanism, the resistance force at the time of deceleration is transmitted to the motor 77 as a turning force, and thus the motor 77 may generate alternating current power utilizing the turning force. This alternating current power is converted into direct current power by the inverter 82, and thus the direct current regenerative electric power is preferably accumulated in the power source 76.

The controller 74 controls the operation of the entire electrically driven vehicle. This controller 74 includes, for example, a CPU. The power source 76 includes one or two or more secondary batteries. This power source 76 may be connected to an external power source as well as receives electric power supply from the external power source to accumulate electric power in the power source 76. The various sensors 84 are used, for example, to control the number of revolutions of the engine 75 as well as to control the opening of the throttle valve (throttle opening). These various sensors 84 include any one kind or two or more kinds among, for example, a speed sensor, an acceleration sensor, and an engine speed sensor.

Incidentally, a case in which the electrically driven vehicle is a hybrid vehicle is taken as an example, but the electrically driven vehicle may be a vehicle (electric vehicle) which operates using only the power source 76 and the motor 77 without using the engine 75.

Figure 10:
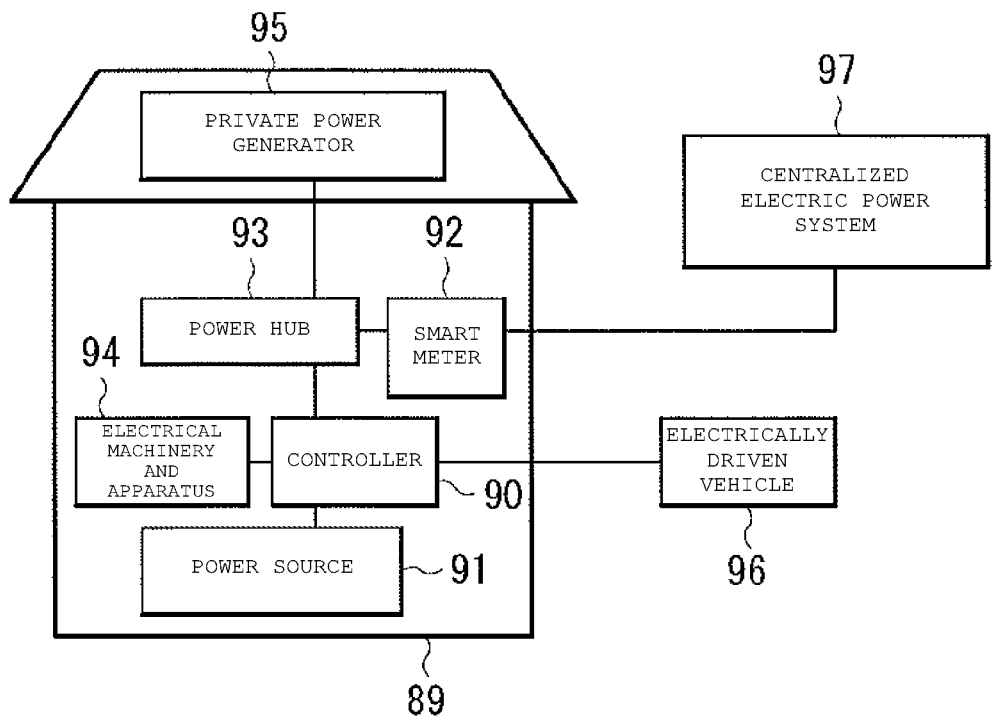
FIG. 10 is a block diagram illustrating the configuration of an application example (electric power storage system) of a secondary battery according to an embodiment of the present technology.

FIG. 10 illustrates a block configuration of an electric power storage system.

This electric power storage system includes, for example, a controller 90, a power source 91, a smart meter 92, and a power hub 93 inside a house 89 such as a general house and a commercial building.

Here, the power source 91 can be connected to, for example, an electrical machinery and apparatus 94 installed inside the house 89 as well as an electrically driven vehicle 96 stopped outside the house 89. In addition, the power source 91 can be connected to, for example, a private power generator 95 installed in the house 89 via the power hub 93 as well as an external centralized electric power system 97 via the smart meter 92 and the power hub 93.

Incidentally, the electrical machinery and apparatus 94 includes, for example, one kind or two or more kinds of household appliances, and examples of the household appliances include a refrigerator, an air conditioner, a television, and a water heater. The private power generator 95 includes any one kind or two or more kinds among, for example, a solar power generator and a wind power generator. The electrically driven vehicle 96 includes any one kind or two or more kinds among, for example, an electric vehicle, an electric motorcycle, a hybrid vehicle. The centralized electric power system 97 includes any one kind or two or more kinds among, for example, a thermal power plant, a nuclear power plant, a hydroelectric power plant, and a wind power plant.

The controller 90 controls the operation (including the usage state of the power source 91) of the entire electric power storage system. This controller 90 includes, for example, a CPU. The power source 91 includes one or two or more secondary batteries. The smart meter 92 is, for example, a network-compatible electric power meter installed in the house 89 on the electric power demand side and can communicate with the electric power supply side.

Accordingly, the smart meter 92 enables highly efficient and stable energy supply, for example, by controlling the balance between the supply and demand of electric power in the house 89 while communicating with the outside.

In this electric power storage system, for example, electric power is accumulated in the power source 91 from the centralized electric power system 97 which is an external power source via the smart meter 92 and the power hub 93 as well as from the private power generator 95 which is an independent power source via the power hub 93. The electric power accumulated in this power source 91 is supplied to the electrical machinery and apparatus 94 and the electrically driven vehicle 96 in accordance with the instruction from the controller 90, and thus the electrical machinery and apparatus 94 can work as well as the electrically driven vehicle 96 can be charged. In other words, the electric power storage system is a system which makes it possible to accumulate and supply electric power in the house 89 using the power source 91.

The electric power accumulated in this power source 91 can be used if necessary.

For this reason, for example, electric power can be accumulated from the centralized electric power system 97 to the power source 91 at midnight when the electricity usage fee is low and the electric power accumulated in this power source 91 can be used during the day when the electricity usage fee is high.

Incidentally, the electric power storage system described above may be installed for each house (one household) or for a plurality of houses (multiple households).

Figure 11:
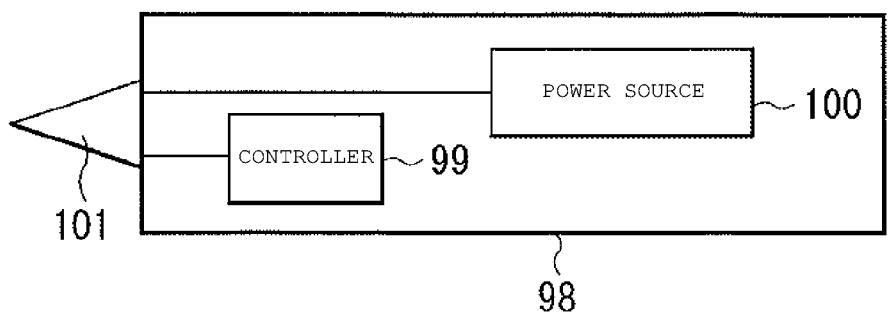
FIG. 11 is a block diagram illustrating the configuration of an application example (electric tool) of a secondary battery according to an embodiment of the present technology.

FIG. 11 illustrates a block configuration of an electric tool.

Examples of the electric tool to be described here include an electric drill. This electric tool includes, for example, a controller 99 and a power source 100 inside a tool body 98. For example, a drill unit 101 which is a moving unit is attached to this tool body 98 so as to work (rotate).

The tool body 98 contains, for example, a plastic material. The controller 99 controls the operation (including the usage state of the power source 100) of the entire electric tool. This controller 99 includes, for example, a CPU. The power source 100 includes one or two or more secondary batteries. The controller 99 supplies electric power from the power source 100 to the drill unit 101 in accordance with the operation of the operation switch.

EXAMPLES

Examples of the present technology will be described.

Experimental Examples 1-1 to 1-15

The laminated film type lithium ion secondary battery illustrated in FIGS. 4 and 5 was fabricated according to the following procedure.

In the case of fabricating the positive electrode 33, a positive electrode mixture was first prepared by mixing 95 parts by mass of a positive electrode active material (lithium cobaltate), 3 parts by mass of a positive electrode binder (polyvinylidene fluoride), and 2 parts by mass of a positive electrode conductive agent (Ketjen Black). Subsequently, the positive electrode mixture was added to an organic solvent (N-methyl-2-pyrrolidone), and then the organic solvent was stirred to prepare a paste-like positive electrode mixture slurry. Subsequently, the positive electrode mixture slurry was applied to both surfaces of the positive electrode current collector 33A (aluminum foil, thickness=10 µm) using a coating apparatus and then dried with warm air to form the positive electrode active material layer 33B. Finally, the positive electrode active material layer 33B was compression-molded using a roll press. Finally, the positive electrode current collector 33A on which the positive electrode active material layer 33B was formed was cut into a strip shape (length=800 mm, width=70 mm).

In the case of fabricating the negative electrode 34, a negative electrode mixture was first prepared by mixing a negative electrode active material containing a powdery carbon-containing material (mesocarbon microbeads (MCMB)) and a powdery silicon-containing material (simple substance (Si) of silicon), a negative electrode binder (polyvinylidene fluoride (PVDF)), a negative electrode conductive agent (carbon fiber (CF) which was a fibrous carbon material), a negative electrode conductive agent (carbon black (CB) which was a flaky carbon material), and polycarboxylic acid (maleic acid (MA)). In this case, for comparison, a negative electrode mixture was obtained according to the same procedure except that a polycarboxylic acid was not used.

The median diameter D50 (µm), average aspect ratio (AR), and content (% by weight) of carbon-containing materials, the 10% particle diameter D10 (µm), median diameter D50 (µm), and content (% by weight) of silicon-containing materials, the particle diameter ratio, the active material proportion (%), and the spreading resistance distribution a/b in the negative electrode active material layer 33B are as presented in Table 1. Incidentally, the details of the measurement method and measurement conditions of the spreading resistance distribution a/b are as described above.

In addition, the weight average molecular weight Mw and content (% by weight) of the negative electrode binder, the content (% by weight) of the negative electrode conductive agent (fibrous carbon material and flaky carbon material), and the presence or absence and content (% by weight) of polycarboxylic acids are as presented in Table 2.

Subsequently, the negative electrode mixture was mixed with an organic solvent (N-methyl-2-pyrrolidone), and then the mixture was kneaded and dispersed using a rotary and revolutionary mixer to prepare a paste-like negative electrode mixture slurry. Subsequently, the negative electrode mixture slurry was applied to both surfaces of the negative electrode current collector 34A (copper foil, thickness=12 µm) using a coating apparatus and then dried (drying temperature=120° C.) to form the negative electrode active material layer 34B (thickness=60 µm). Subsequently, the negative electrode active material layer 34B was compression-molded using a roll press and then vacuum dried. In this case, the volume density of the negative electrode active material layer 34B was set to 1.8 g/cm$^3$. Finally, the negative electrode current collector 34A on which the negative electrode active material layer 34B was formed was cut into a strip shape (length=500 mm, width=30 mm).

In the case of preparing an electrolytic solution, an electrolyte salt (lithium hexafluoride) was added to a solvent (ethylene carbonate and ethyl methyl carbonate) and then the solvent was stirred.

In this case, the mixing ratio (weight ratio) of the solvent was set so that ethylene carbonate:ethyl methyl carbonate=50:50 and the content of the electrolyte salt was set to 1 mol/dm$^3$ (=1 mol/l) with respect to the solvent.

In the case of assembling a secondary battery, first, the aluminum positive electrode lead 31 was welded to the positive electrode current collector 33A as well as the copper negative electrode lead 32 was welded to the negative electrode current collector 34A. Subsequently, the positive electrode 33 and the negative electrode 34 were stacked with the separator 35 (microporous polyethylene film, thickness=25 μm) interposed therebetween and then the positive electrode 33, the negative electrode 34, and the separator 35 were wound to form a wound body. Thereafter, the protective tape 37 was pasted to the outermost peripheral portion of the wound body. Subsequently, the exterior member 40 (outer side: nylon film, thickness=25 μm/aluminum foil, thickness=40 μm/polypropylene film, thickness=30 μm: inner side) was folded so as to sandwich the wound body, and then the peripheral edge portions of three sides of the exterior member 40 were heat-sealed to each other. In this case, a close contact film 41 (polypropylene film, thickness=85 μm) was inserted between the positive electrode lead 31 and the exterior member 40 as well as a close contact film 42 (polypropylene film, thickness=85 μm) was inserted between the negative electrode lead 32 and the exterior member 40. Finally, the electrolyte solution was injected into the exterior member 40, and then the peripheral edge portions of the remaining one side of the exterior member 40 were heat-sealed to each other in a reduced pressure environment. By this, the wound body was impregnated with the electrolytic solution, and the wound electrode body 30 was thus formed.

Consequently, the wound electrode body 30 was encapsulated inside the exterior member 40, and a laminated film type secondary battery was thus completed.

In the case of fabricating this secondary battery, the relation between the charge capacity of the positive electrode 33 and the charge capacity of the negative electrode 34 was set according to the procedure described below.

In the case of determining the charge capacity of the positive electrode 33, a positive electrode 33 for test in which the positive electrode active material layer 33B was formed on one surface of the positive electrode current collector 33A was obtained according to a procedure similar to the procedure of fabricating the positive electrode 33 described above except that the positive electrode active material layer 33B was first formed only on one surface of the positive electrode current collector 33A. Subsequently, a coin type secondary battery was fabricated using the positive electrode 33 for test as a test electrode as well as lithium metal as a counter electrode. Subsequently, the electric capacity of the positive electrode 33 for test was measured by charging the secondary battery. In this case, constant current charging was performed at a current of 0.1 C until the voltage reached 4.4 V and then constant voltage charging was performed at a voltage of 4.4 V until the current reached 0.01 C. Incidentally, 0.1 C is a current value at which the battery capacity (theoretical capacity) can be discharged in 10 hours, and 0.01 C is a current value at which the battery capacity can be discharged in 100 hours. Finally, the charge capacity of the positive electrode 33 for test was determined by calculating the electric capacity of the positive electrode 33 for test per thickness of the positive electrode active material layer 33B.

In the case of determining the charge capacity of the negative electrode 34, a negative electrode 34 for test in which the negative electrode active material layer 34B was formed on one surface of the negative electrode current collector 34A was obtained according to a procedure similar to the procedure of fabricating the negative electrode 34 described above except that the negative electrode active material layer 34B was first formed only on one surface of the negative electrode current collector 34A. Subsequently, a coin type secondary battery was fabricated using the negative electrode 34 as a test electrode as well as lithium metal as a counter electrode. Subsequently, the electric capacity of the negative electrode 34 for test was measured by charging the secondary battery. In this case, constant current charging was performed at a current of 0.1 C until the voltage reached 0 V and then constant voltage charging was performed at a voltage of 0 V until the current reached 0.01 C. Finally, the charge capacity of the negative electrode 34 for test was determined by calculating the electric capacity of the negative electrode 34 for test per thickness of the negative electrode active material layer 34B.

In the case of setting the relation between the charge capacity of the positive electrode 33 and the charge capacity of the negative electrode 34, each of the thickness of the positive electrode active material layer 33B and the thickness of the negative electrode active material layer 34B was adjusted so that the ratio of the charge capacity of the positive electrode 33 to the charge capacity of the negative electrode 34 (=charge capacity of positive electrode 33/charge capacity of negative electrode 34) was 0.9. The solid content concentration and coating speed of the positive electrode mixture slurry were changed in the case of adjusting the thickness of the positive electrode active material layer 33B as well as the solid concentration and coating speed of the negative electrode mixture slurry were changed in the case of adjusting the thickness of the negative electrode active material layer 34B.

The cycle characteristics and capacity characteristics were examined as the battery characteristics of these secondary batteries, and the results presented in Table 2 were attained.

In the case of examining the cycle characteristics, the capacity retention percentage (%) was determined by performing a cycle test.

In the cycle test, in order to stabilize the battery state, the secondary battery was first charged and discharged (1 cycle) in a normal temperature environment (23° C.). At the time of charging, the battery was charged at a current of 0.2 C until the voltage reached 4.35 V and then charged at a voltage of 4.35 V until the current reached 0.025 C. At the time of discharging, the battery was discharged at a current of 0.2 C until the voltage reached 3.0 V. 0.2 C is a current value at which the battery capacity can be discharged in 5 hours, and 0.025 C is a current value at which the battery capacity can be discharged in 40 hours. The contents of the procedure for stabilizing the battery state of secondary batteries described here are the same in the following.

Subsequently, the secondary battery was charged and discharged (1 cycle) again in the same environment to measure the discharge capacity in the second cycle. The charging and discharging conditions were the same as the conditions except that each of the current at the time of charging and the current at the time of discharging was changed to 0.5 C. 0.5 C is a current value at which the battery capacity can be discharged in 4 hours.

Subsequently, the secondary battery was repeatedly charged and discharged in the same environment until the total number of cycles reached 50 cycles to measure the discharge capacity in the 50th cycle.

Finally, the capacity retention percentage (%)=(discharge capacity in 50th cycle/discharge capacity in second cycle)× 100 was calculated.

Meanwhile, in the case of examining the capacity characteristics, the rate of increase in capacity (%) of the negative electrode 34 was determined by performing a comparative test of two kinds of secondary batteries.

In the comparative test, a secondary battery was first fabricated using both a carbon-containing material and a silicon-containing material as a negative electrode active material according to the above-described procedure for fabricating a secondary battery. Subsequently, the secondary battery of which the battery state had been stabilized was charged and discharged (1 cycle) in a normal temperature environment (23° C.) to measure the discharge capacity in the case of concurrently using a carbon-containing material and a silicon-containing material. The charging and discharging conditions in this case were the same as the charging and discharging conditions after the second cycle in the cycle test.

Subsequently, a secondary battery was fabricated according to the same procedure except that a silicon-containing material was not used but only a carbon-containing material was used as a negative electrode active material, and then the discharge capacity in the case of using only a carbon-containing material was measured.

Finally, rate of increase in capacity (%)=(discharge capacity when concurrently using carbon-containing material and silicon-containing material−discharge capacity when using only carbon-containing material/discharge capacity when using only carbon-containing material)×100 was calculated.

TABLE 1

| Experimental Example | Carbon-containing material | | | | Silicon-containing material | | | | Active Particle diameter ratio | material proportion (%) | a/b |
|---|---|---|---|---|---|---|---|---|---|---|---|
| | Kind | D50 (μm) | Average AR | Content (% by weight) | Kind | D10 (μm) | D50 (μm) | Content (% by weight) | | | |
| 1-1 | MCMB | 28 | 1.5 | 84 | Si | 0.7 | 8 | 10 | 0.29 | 10.6 | 1.03 |
| 1-2 | MCMB | 15 | 1.5 | 84 | Si | 0.5 | 1.5 | 10 | 0.1 | 10.6 | 10 |
| 1-3 | MCMB | 17 | 1.5 | 84 | Si | 1 | 1.5 | 10 | 0.14 | 10.6 | 3 |
| 1-4 | MCMB | 21 | 1.5 | 84 | Si | 2 | 4 | 10 | 0.19 | 10.6 | 5 |
| 1-5 | MCMB | 32 | 1.5 | 84 | Si | 5 | 16 | 10 | 0.5 | 10.6 | 6.3 |
| 1-6 | MCMB | 29 | 1.5 | 84 | Si | 3 | 9 | 10 | 0.31 | 10.6 | 7.9 |
| 1-7 | MCMB | 22 | 1.5 | 84 | Si | 0.1 | 5 | 10 | 0.23 | 10.6 | 8.9 |
| 1-8 | MCMB | 28 | 1.5 | 84 | Si | 0.7 | 8 | 10 | 0.29 | 10.6 | 1.03 |
| 1-9 | MCMB | 28 | 1.5 | 84 | Si | 0.7 | 6 | 10 | 0.29 | 10.6 | 20 |
| 1-10 | MCMB | 82 | 1.5 | 84 | Si | 0.7 | 8 | 10 | 0.29 | 10.6 | 1.01 |
| 1-11 | MCMB | 28 | 1.5 | 84 | Si | 0.09 | 8 | 10 | 0.99 | 10.6 | 30 |
| 1-12 | MCMB | 28 | 1.5 | 84 | Si | 5.1 | 16 | 10 | 0.57 | 10.6 | 20 |
| 1-13 | MCMB | 14.5 | 1.5 | 84 | Si | 0.7 | 14 | 10 | 0.97 | 10.6 | 15 |
| 1-14 | MCMB | 32.5 | 1.5 | 84 | Si | 0.7 | 16.5 | 10 | 0.51 | 10.6 | 20 |
| 1-15 | MCMB | 28 | 1.5 | 84 | Si | 0.7 | 8 | 10 | 0.99 | 10.6 | 23 |

TABLE 2

| Experimental Example | Negative electrode binder | | | Negative electrode conductive agent | | | | | | | Capacity retention percentage (%) | Rate of increase in capacity (%) |
|---|---|---|---|---|---|---|---|---|---|---|---|---|
| | | | | Fibrous carbon material | | Flaky carbon material | | Polycarboxylic acid | | | | |
| | Kind | Mw | Content (% by weight) | Kind | Content (% by weight) | Kind | Content (% by weight) | Kind | Content (% by weight) | | | |
| 1-1 | PVDF | 3 million | 3 | CF | 1.5 | CB | 1.5 | MA | 1 | | 95.8 | 10 |
| 1-2 | PVDF | 3 million | 3 | CF | 1.5 | CB | 1.5 | MA | 1 | | 99 | 6.2 |
| 1-3 | PVDF | 3 million | 3 | CF | 1.5 | CB | 1.5 | MA | 1 | | 98.5 | 7.2 |
| 1-4 | PVDF | 3 million | 3 | CF | 1.5 | CB | 1.5 | MA | 1 | | 94.4 | 11 |
| 1-5 | PVDF | 3 million | 3 | CF | 1.5 | CB | 1.5 | MA | 1 | | 95.4 | 10.3 |
| 1-6 | PVDF | 3 million | 3 | CF | 1.5 | CB | 1.5 | MA | 1 | | 97 | 9 |
| 1-7 | PVDF | 3 million | 3 | CF | 1.5 | CB | 1.5 | MA | 1 | | 98.2 | 7.5 |
| 1-8 | PVDF | 3 million | 3 | CF | 1.5 | CB | 1.5 | — | — | | 93.2 | 7.1 |
| 1-9 | PVDF | 3 million | 3 | CF | 1.5 | CB | 1.5 | MA | 1 | | 99.2 | 5.9 |
| 1-10 | PVDF | 3 million | 3 | CF | 1.5 | CB | 1.5 | MA | 1 | | 73 | 11.4 |
| 1-11 | PVDF | 3 million | 3 | CF | 1.5 | CB | 1.5 | MA | 1 | | 99.4 | 5.2 |
| 1-12 | PVDF | 3 million | 3 | CF | 1.5 | CB | 1.5 | MA | 1 | | 99.3 | 5.9 |
| 1-13 | PVDF | 3 million | 3 | CF | 1.5 | CB | 1.5 | MA | 1 | | 99 | 6.2 |
| 1-14 | PVDF | 3 million | 3 | CF | 1.5 | CB | 1.5 | MA | 1 | | 99.2 | 6.8 |
| 1-15 | PVDF | 3 million | 3 | CF | 1.5 | CB | 1.5 | — | — | | 99.3 | 5.6 |

Each of the capacity retention percentage and the rate of increase in capacity greatly varied depending on the spreading resistance distribution a/b. In this case, when the spreading resistance distribution a/b was 1.03 to 10 (Experimental Examples 1-1 to 1-8), a high capacity retention percentage was attained while a high increase in capacity was maintained as compared to a case in which the spreading resistance distribution a/b was out of the above range (Experimental Examples 1-9 to 1-15).

In particular, in a case in which the spreading resistance distribution a/b was in a proper range (=1.03 to 10), the following tendency was attained.

First, each of the capacity retention percentage and the rate of increase in capacity was higher when the 10% particle diameter D10 was 1 μm to 5 μm and the particle diameter ratio was 0.1 to 0.5 (Experimental Examples 1-3 to 1-5).

Second, a sufficient capacity retention percentage was attained as well as a sufficient rate of increase in capacity was attained when the negative electrode binder contained polyvinylidene fluoride.

Third, a sufficient capacity retention percentage was attained as well as a sufficient rate of increase in capacity was attained when the negative electrode conductive agent contains a fibrous carbon material and a flaky carbon material.

Fourth, each of the capacity retention percentage and the rate of increase in capacity was higher when the negative electrode active material layer 34B contains a polycarboxylic acid (Experimental Example 1-1).

Experimental Examples 2-1 to 2-8

As presented in Tables 3 and 4, secondary batteries were fabricated according to the same procedure except that the average aspect ratio of the carbon-containing material was changed as well as the battery characteristics thereof were evaluated. In order to change the average aspect ratio, plural kinds of carbon-containing materials (mesocarbon microbeads) having different average aspect ratios were used.

TABLE 3

| | Negative electrode active material | | | | | | | | | |
|---|---|---|---|---|---|---|---|---|---|---|
| | Carbon-containing material | | | | Silicon-containing material | | | | Active | |
| Experimental Example | Kind | D50 (μm) | Average AR | Content (% by weight) | Kind | D10 (μm) | D50 (μm) | Content (% by weight) | Particle diameter ratio | material proportion (%) | a/b |
| 2-1 | MCMB | 28 | 1 | 84 | Si | 0.7 | 8 | 10 | 0.29 | 10.6 | 4 |
| 2-2 | MCMB | 28 | 1.1 | 84 | Si | 0.7 | 8 | 10 | 0.29 | 10.6 | 3 |
| 2-3 | MCMB | 28 | 1.3 | 84 | Si | 0.7 | 8 | 10 | 0.29 | 10.6 | 1.76 |
| 1-1 | MCMB | 28 | 1.5 | 84 | Si | 0.7 | 8 | 10 | 0.29 | 10.6 | 1.03 |
| 2-4 | MCMB | 28 | 1.7 | 84 | Si | 0.7 | 8 | 10 | 0.29 | 10.6 | 5 |
| 2-5 | MCMB | 28 | 1.8 | 84 | Si | 0.7 | 8 | 10 | 0.29 | 10.6 | 7 |
| 2-6 | MCMB | 28 | 2 | 84 | Si | 0.7 | 8 | 10 | 0.29 | 10.6 | 8 |
| 2-7 | MCMB | 28 | 2.1 | 84 | Si | 0.7 | 8 | 10 | 0.29 | 10.6 | 12 |
| 2-8 | MCMB | 28 | 2.1 | 84 | Si | 0.7 | 8 | 10 | 0.29 | 10.6 | 20 |

TABLE 4

| | | | Negative electrode conductive agent | | | | | | Capacity | Rate of |
|---|---|---|---|---|---|---|---|---|---|---|
| | Negative electrode binder | | Fibrous carbon material | | Flaky carbon material | | Polycarboxylic acid | | retention | increase in |
| Experimental Example | Kind | Mw | Content (% by weight) | Kind | Content (% by weight) | Kind | Content (% by weight) | Kind | Content (% by weight) | percentage (%) | capacity (%) |
| 2-1 | PVDF | 3 million | 3 | CF | 1.5 | CB | 1.5 | MA | 1 | 94.6 | 6 |
| 2-2 | PVDF | 3 million | 3 | CF | 1.5 | CB | 1.5 | MA | 1 | 97.9 | 7.9 |
| 2-3 | PVDF | 3 million | 3 | CF | 1.5 | CB | 1.5 | MA | 1 | 97 | 8.8 |
| 1-1 | PVDF | 3 million | 3 | CF | 1.5 | CB | 1.5 | MA | 1 | 95.8 | 10 |
| 2-4 | PVDF | 3 million | 3 | CF | 1.5 | CB | 1.5 | MA | 1 | 98.6 | 6.9 |
| 2-5 | PVDF | 3 million | 3 | CF | 1.5 | CB | 1.5 | MA | 1 | 98.8 | 6.6 |
| 2-6 | PVDF | 3 million | 3 | CF | 1.5 | CB | 1.5 | MA | 1 | 99 | 6.2 |
| 2-7 | PVDF | 3 million | 3 | CF | 1.5 | CB | 1.5 | MA | 1 | 94.3 | 5.8 |
| 2-8 | PVDF | 3 million | 3 | CF | 1.5 | CB | 1.5 | MA | 1 | 99.2 | 5.8 |

In a case in which the average aspect ratio was 1.1 to 2 (Experimental Examples 1-1, 2-2 to 2-6), each of the capacity retention percentage and the rate of increase in capacity was higher as compared to a case in which the average aspect ratio was out of the above range (Experimental Examples 2-1, 2-7, 2-8).

Experimental Examples 3-1 to 3-5

As presented in Tables 5 and 6, secondary batteries were fabricated according to the same procedure except that the active material proportion was changed as well as the battery characteristics thereof were evaluated. In order to change the active material proportion, the mixing ratio of the carbon-containing material to the silicon-containing material was changed.

TABLE 5

| Experimental Example | Negative electrode active material | | | | | | | | Active | |
|---|---|---|---|---|---|---|---|---|---|---|
| | Carbon-containing material | | | Silicon-containing material | | | | Particle diameter ratio | material proportion (%) | a/b |
| | Kind | D50 (μm) | Average AR | Content (% by weight) | Kind | D10 (μm) | D50 (μm) | Content (% by weight) | | | |
| 3-1 | MCMB | 28 | 1.5 | 84 | Si | 0.7 | 8 | 5 | 0.29 | 5 | 1.03 |
| 1-1 | MCMB | 28 | 1.5 | 84 | Si | 0.7 | 8 | 10 | 0.29 | 10.6 | 1.03 |
| 3-2 | MCMB | 28 | 1.5 | 82 | Si | 0.7 | 8 | 12 | 0.29 | 20 | 3.4 |
| 3-3 | MCMB | 28 | 1.5 | 74 | Si | 0.7 | 8 | 20 | 0.29 | 30 | 5.5 |
| 3-4 | MCMB | 28 | 1.5 | 69 | Si | 0.7 | 8 | 25 | 0.29 | 40 | 6.2 |
| 3-5 | MCMB | 28 | 1.5 | 64 | Si | 0.7 | 8 | 30 | 0.29 | 20 | 20 |

TABLE 6

| Experimental Example | Negative electrode binder | | Negative electrode conductive agent | | | | | | Capacity retention percentage (%) | Rate of increase in capacity (%) |
|---|---|---|---|---|---|---|---|---|---|---|
| | | | Fibrous carbon material | | Flaky carbon material | | Polycarboxylic acid | | | |
| | Kind | Mw | Kind | Content (% by weight) | Kind | Content (% by weight) | Kind | Content (% by weight) | | |
| 3-1 | PVDF | 3 million | 3 | CF | 1.5 | CB | 1.5 | MA | 1 | 99.1 | 5.2 |
| 1-1 | PVDF | 3 million | 3 | CF | 1.5 | CB | 1.5 | MA | 1 | 95.8 | 10 |
| 3-2 | PVDF | 3 million | 3 | CF | 1.5 | CB | 1.5 | MA | 1 | 94.2 | 12.1 |
| 3-3 | PVDF | 3 million | 3 | CF | 1.5 | CB | 1.5 | MA | 1 | 92.9 | 19.7 |
| 3-4 | PVDF | 3 million | 3 | CF | 1.5 | CB | 1.5 | MA | 1 | 91.3 | 24.3 |
| 3-5 | PVDF | 3 million | 3 | CF | 1.5 | CB | 1.5 | MA | 1 | 70.2 | 29.7 |

In a case in which the active material proportion was 30% by weight or less (Experimental Examples 1-1, 3-1 to 3-3), each of the capacity retention percentage and the rate of increase in capacity was higher as compared to a case in which the active material proportion was out of the above range (Experimental Example 3-4). Of course, in a case in which the spreading resistance distribution a/b was out of the above range (Experimental Example 3-5), a sufficient capacity retention percentage was not attained as well as a sufficient rate of increase in capacity was not attained.

Experimental Examples 4-1 to 4-12

As presented in Tables 7 and 8, secondary batteries were fabricated according to the same procedure except that the content of negative electrode conductive agent (fibrous carbon material and flaky carbon material) was changed as well as the battery characteristics thereof were evaluated. In order to change the content of negative electrode conductive agent, the respective amounts of the fibrous carbon material and flaky carbon material added were changed.

TABLE 7

| Experimental Example | Negative electrode active material | | | | | | | | Active | |
|---|---|---|---|---|---|---|---|---|---|---|
| | Carbon-containing material | | | Silicon-containing material | | | | Particle diameter ratio | material proportion (%) | a/b |
| | Kind | D50 (μm) | Average AR | Content (% by weight) | Kind | D10 (μm) | D50 (μm) | Content (% by weight) | | | |
| 4-1 | MCMB | 28 | 1.5 | 84 | Si | 0.7 | 8 | 10 | 0.29 | 10.6 | 30 |
| 4-2 | MCMB | 28 | 1.5 | 84 | Si | 0.7 | 8 | 10 | 0.29 | 10.6 | 9.4 |
| 4-3 | MCMB | 28 | 1.5 | 84 | Si | 0.7 | 8 | 10 | 0.29 | 10.6 | 1.15 |
| 4-4 | MCMB | 28 | 1.5 | 84 | Si | 0.7 | 8 | 10 | 0.29 | 10.6 | 2 |
| 1-1 | MCMB | 28 | 1.5 | 84 | Si | 0.7 | 8 | 10 | 0.29 | 10.6 | 1.03 |
| 4-5 | MCMB | 28 | 1.5 | 84 | Si | 0.7 | 8 | 10 | 0.29 | 10.6 | 2 |
| 4-6 | MCMB | 28 | 1.5 | 84 | Si | 0.7 | 8 | 10 | 0.29 | 10.6 | 1.8 |
| 4-7 | MCMB | 28 | 1.5 | 84 | Si | 0.7 | 8 | 10 | 0.29 | 10.6 | 1.5 |
| 4-8 | MCMB | 28 | 1.5 | 84 | Si | 0.7 | 8 | 10 | 0.29 | 10.6 | 1.3 |
| 4-9 | MCMB | 28 | 1.5 | 84 | Si | 0.7 | 8 | 10 | 0.29 | 10.6 | 10 |
| 4-10 | MCMB | 28 | 1.5 | 84 | Si | 0.7 | 8 | 10 | 0.29 | 10.6 | 1 |
| 4-11 | MCMB | 28 | 1.5 | 84 | Si | 0.7 | 8 | 10 | 0.29 | 10.6 | 25 |
| 4-12 | MCMB | 28 | 1.5 | 84 | Si | 0.7 | 8 | 10 | 0.29 | 10.6 | 1 |

TABLE 8

| Experimental Example | Negative electrode binder | | | Negative electrode conductive agent | | | | Polycarboxylic acid | | Capacity retention percentage (%) | Rate of increase in capacity (%) |
| --- | --- | --- | --- | --- | --- | --- | --- | --- | --- | --- | --- |
| | Kind | Mw | Content (% by weight) | Fibrous carbon material | | Flaky carbon material | | | | | |
| | | | | Kind | Content (% by weight) | Kind | Content (% by weight) | Kind | Content (% by weight) | | |
| 4-1 | PVDF | 3 million | 3 | CF | 0.09 | CB | 1.5 | MA | 1 | 99.4 | 5.2 |
| 4-2 | PVDF | 3 million | 3 | CF | 0.09 | CB | 4 | MA | 1 | 93.8 | 8.9 |
| 4-3 | PVDF | 3 million | 3 | CF | 0.1 | CB | 3 | MA | 1 | 96 | 9.7 |
| 4-4 | PVDF | 3 million | 3 | CF | 1 | CB | 1.5 | MA | 1 | 97 | 9 |
| 1-1 | PVDF | 3 million | 3 | CF | 1.5 | CB | 1.5 | MA | 1 | 95.8 | 10 |
| 4-5 | PVDF | 3 million | 3 | CF | 1.5 | CB | 1 | MA | 1 | 96.6 | 9.3 |
| 4-6 | PVDF | 3 million | 3 | CF | 2 | CB | 0.5 | MA | 1 | 96.2 | 9.7 |
| 4-7 | PVDF | 3 million | 3 | CF | 2.5 | CB | 0.3 | MA | 1 | 95.4 | 10.3 |
| 4-8 | PVDF | 3 million | 3 | CF | 3 | CB | 0.1 | MA | 1 | 94.9 | 10.7 |
| 4-9 | PVDF | 3 million | 3 | CF | 4 | CB | 0.09 | MA | 1 | 93.6 | 8.6 |
| 4-10 | PVDF | 3 million | 3 | CF | 3.01 | CB | 1.5 | MA | 1 | 70 | 11.7 |
| 4-11 | PVDF | 3 million | 3 | CF | 1.5 | CB | 0.09 | MA | 1 | 99.3 | 5.5 |
| 4-12 | PVDF | 3 million | 3 | CF | 1.5 | CB | 3.01 | MA | 1 | 70 | 11.7 |

In a case in which the content of fibrous carbon material was 0.1% by weight to 3% by weight and the content of flaky carbon material was 0.1% by weight to 3% by weight (Experimental Examples 1-1, 4-3 to 4-8), each of the capacity retention percentage and the rate of increase in capacity was higher as compared to a case in which these contents were both out of the above range (Experimental Examples 4-2, 4-9). Of course, in a case in which the spreading resistance distribution a/b was out of the above range (Experimental examples 4-1, 4-10 to 4-12), a sufficient capacity retention percentage was not attained as well as a sufficient rate of increase in capacity was not attained.

Experimental Examples 5-1 to 5-11

As presented in Tables 9 and 10, secondary batteries were fabricated according to the same procedure except that the content and weight average molecular weight Mw of negative electrode binder (polyvinylidene fluoride) were changed as well as the battery characteristics thereof were evaluated. The amount of polyvinylidene fluoride added was changed in order to change the content of negative electrode binder as well as plural kinds of polyvinylidene fluoride having different weight average molecular weights Mw were used in order to change the weight average molecular weight Mw.

TABLE 9

| Experimental Example | Negative electrode active material | | | | | | | | Active material proportion (%) | a/b |
| --- | --- | --- | --- | --- | --- | --- | --- | --- | --- | --- |
| | Carbon-containing material | | | | Silicon-containing material | | | Particle diameter ratio | | |
| | Kind | D50 (μm) | Average AR | Content (% by weight) | Kind | D10 (μm) | D50 (μm) | Content (% by weight) | | |
| 5-1 | MCMB | 28 | 1.5 | 84 | Si | 0.7 | 8 | 10 | 0.29 | 10.6 | 30 |
| 5-2 | MCMB | 28 | 1.5 | 84 | Si | 0.7 | 8 | 10 | 0.29 | 10.6 | 9 |
| 5-3 | MCMB | 28 | 1.5 | 84 | Si | 0.7 | 8 | 10 | 0.29 | 10.6 | 1.3 |
| 5-4 | MCMB | 28 | 1.5 | 84 | Si | 0.7 | 8 | 10 | 0.29 | 10.6 | 1.1 |
| 5-5 | MCMB | 28 | 1.5 | 84 | Si | 0.7 | 8 | 10 | 0.29 | 10.6 | 1.2 |
| 5-6 | MCMB | 28 | 1.5 | 84 | Si | 0.7 | 8 | 10 | 0.29 | 10.6 | 1.03 |
| 1-1 | MCMB | 28 | 1.5 | 84 | Si | 0.7 | 8 | 10 | 0.29 | 10.6 | 1.03 |
| 5-7 | MCMB | 28 | 1.5 | 84 | Si | 0.7 | 8 | 10 | 0.29 | 10.6 | 1.08 |
| 5-8 | MCMB | 28 | 1.5 | 84 | Si | 0.7 | 8 | 10 | 0.29 | 10.6 | 1.9 |
| 5-9 | MCMB | 28 | 1.5 | 84 | Si | 0.7 | 8 | 10 | 0.29 | 10.6 | 2 |
| 5-10 | MCMB | 28 | 1.5 | 84 | Si | 0.7 | 8 | 10 | 0.29 | 10.6 | 8 |
| 5-11 | MCMB | 28 | 1.5 | 84 | Si | 0.7 | 8 | 10 | 0.29 | 10.6 | 30 |

TABLE 10

| Experimental Example | Negative electrode binder | | | Negative electrode conductive agent | | | | Polycarboxylic acid | | Capacity retention percentage (%) | Rate of increase in capacity (%) |
| --- | --- | --- | --- | --- | --- | --- | --- | --- | --- | --- | --- |
| | Kind | Mw | Content (% by weight) | Fibrous carbon material | | Flaky carbon material | | | | | |
| | | | | Kind | Content (% by weight) | Kind | Content (% by weight) | Kind | Content (% by weight) | | |
| 5-1 | PVDF | 250,000 | 3 | CF | 1.5 | CB | 1.5 | MA | 1 | 99.3 | 5.6 |
| 5-2 | PVDF | 300,000 | 3 | CF | 1.5 | CB | 1.5 | MA | 1 | 98.3 | 7.2 |
| 5-3 | PVDF | 1 million | 3 | CF | 1.5 | CB | 1.5 | MA | 1 | 96.6 | 9.3 |
| 5-4 | PVDF | 2 million | 3 | CF | 1.5 | CB | 1.5 | MA | 1 | 96.2 | 9.7 |
| 5-5 | PVDF | 3 million | 1 | CF | 1.5 | CB | 1.5 | MA | 1 | 95.2 | 11.3 |

TABLE 10-continued

| | Negative electrode binder | | | Negative electrode conductive agent | | | | | | Capacity retention percentage (%) | Rate of increase in capacity (%) |
| | | | | Fibrous carbon material | | Flaky carbon material | | Polycarboxylic acid | | | |
| Experimental Example | Kind | Mw | Content (% by weight) | Kind | Content (% by weight) | Kind | Content (% by weight) | Kind | Content (% by weight) | | |
|---|---|---|---|---|---|---|---|---|---|---|---|
| 5-6 | PVDF | 3 million | 2 | CF | 1.5 | CB | 1.5 | MA | 1 | 95.6 | 10.7 |
| 1-1 | PVDF | 3 million | 3 | CF | 1.5 | CB | 1.5 | MA | 1 | 95.8 | 10 |
| 5-7 | PVDF | 3 million | 5 | CF | 1.5 | CB | 1.5 | MA | 1 | 95.7 | 9.9 |
| 5-8 | PVDF | 3 million | 10 | CF | 1.5 | CB | 1.5 | MA | 1 | 96.5 | 7.5 |
| 5-9 | PVDF | 4 million | 3 | CF | 1.5 | CB | 1.5 | MA | 1 | 97.3 | 8.6 |
| 5-10 | PVDF | 5 million | 3 | CF | 1.5 | CB | 1.5 | MA | 1 | 98 | 7.6 |
| 5-11 | PVDF | 7 million | 3 | CF | 1.5 | CB | 1.5 | MA | 1 | 99.3 | 50.4 |

In a case in which the weight average molecular weight Mw of negative electrode binder was 300,000 to 5,000,000 (Experimental Examples 1-1, 5-2 to 5-10), each of the capacity retention percentage and the rate of increase in capacity was higher as compared to a case in which the weight average molecular weight Mw was out of the above range (Experimental Examples 5-1, 5-11).

In addition, in a case in which the content of negative electrode binder was 2% by weight to 5% by weight (Experimental Examples 1-1, 5-6, 5-7), each of the capacity retention percentage and the rate of increase in capacity was higher as compared to a case in which the content of negative electrode binder was out of the above range (Experimental Examples 5-5, 5-8)

From the results presented in Tables 1 to 10, cycle characteristics and capacity characteristics were both ameliorated when the negative electrode active material layer contained a carbon-containing material and a silicon-containing material as a negative electrode active material and the spreading resistance distribution a/b in the negative electrode active material layer was 1.03 to 10 as measured using a scanning spreading resistance microscope. Consequently, excellent battery characteristics were attained in the secondary batteries.

The present technology has been described above with reference to a series of embodiments and Examples, but the present technology is not limited to the aspect described in the respective embodiments and Examples, and various modifications can be made.

Specifically, a case in which the battery element has a winding structure has been described, but the present technology is not limited to this. For example, the battery element may have another structure such as a stacked structure.

Moreover, a lithium ion secondary battery in which the capacity of the negative electrode is attained by utilizing the lithium storing phenomenon and the lithium release phenomenon has been described, but the present technology is not limited to this. For example, the secondary battery may be a lithium metal secondary battery in which the capacity of the negative electrode is attained by utilizing a lithium precipitation phenomenon and a lithium dissolution phenomenon. Moreover, the secondary battery may be, for example, a secondary battery in which the capacity of the negative electrode is attained based on the sum of the capacity due to storage and release of lithium and the capacity due to precipitation and dissolution of lithium by setting the capacity of a negative electrode active material capable of storing and releasing lithium to be smaller than the capacity of the positive electrode.

Moreover, a secondary battery in which lithium is used as an electrode reactant has been described, but the present technology is not limited to this. The electrode reactant may be, for example, other group 1 elements in the extended periodic table such as sodium and potassium, group 2 elements in the extended periodic table such as magnesium and calcium, or other light metals such as aluminum.

Incidentally, the effects described in the present specification are an illustration to the utmost and are not limited. Moreover, there may be other effects.

The present technology is described below in further detail according to an embodiment.

(1) A secondary battery including:
  a positive electrode;
  a negative electrode including (A) a negative electrode current collector and a negative electrode active material layer which is provided on the negative electrode current collector and contains a negative electrode active material, in which (B) the negative electrode active material contains a carbon-containing material and a silicon-containing material, and (C) a spreading resistance distribution a/b in the negative electrode active material layer is 1.03 or more and 10 or less as measured using a scanning spreading resistance microscope; and
  an electrolytic solution.

(2) The secondary battery according to (1), in which
  the carbon-containing material is a plurality of particulate carbon-containing materials and the silicon-containing material is a plurality of particulate silicon-containing materials,
  a 10% particle diameter D10 (μm) of the plurality of particulate silicon-containing materials is 1 μm or more and 5 μm or less, and
  a ratio of a median diameter D50 (μm) of the plurality of particulate silicon-containing materials to a median diameter D50 (μm) of the plurality of particulate carbon-containing materials is 0.1 or more and 0.5 or less.

(3) The secondary battery according to (1) or (2), in which
  the carbon-containing material is a plurality of particulate carbon-containing materials, in which
  an average aspect ratio of the plurality of particulate carbon-containing materials is 1.1 or more and 2.0 or less.

(4) The secondary battery according to any one of (1) to (3), in which
  a proportion (% by weight) of a weight of the silicon-containing material to a sum of a weight of the carbon-containing material and the weight of the silicon-containing material is 30% by weight or less.

(5) The secondary battery according to any one of (1) to (4), in which
the negative electrode active material layer further contains a negative electrode conductive agent, in which
the negative electrode conductive agent contains a fibrous carbon material and a flaky carbon material.
(6) The secondary battery according to (5), in which
a proportion (% by weight) of a weight of the fibrous carbon material to a sum of the weight of the fibrous carbon material and a weight of the flaky carbon material is 0.1% by weight or more and 3.0% by weight or less, and
a proportion (% by weight) of the weight of the flaky carbon material to the sum of the weight of the fibrous carbon material and the weight of the flaky carbon material is 0.1% by weight or more and 3.0% by weight or less.
(7) The secondary battery according to any one of (1) to (6), in which
the negative electrode further contains a negative electrode binder, in which
the negative electrode binder contains polyvinylidene fluoride.
(8) The secondary battery according to (7), in which
a proportion (% by weight) of a weight of the negative electrode binder to a weight of the negative electrode active material layer is 2% by weight or more and 5% by weight or less.
(9) The secondary battery according to (7) or (8), in which
a weight average molecular weight of the polyvinylidene fluoride is 300,000 or more and 5,000,000 or less.
(10) The secondary battery according to any one of (1) to (9), in which
the negative electrode active material layer further contains a polycarboxylic acid.
(11) The secondary battery according to (10), in which
the polyvalent carboxylic acid includes maleic acid.
(12) The secondary battery according to any one of (1) to (11), in which
the secondary battery is a lithium ion secondary battery.
(13) A battery pack including:
the secondary battery according to any one of (1) to (12);
a controller that controls operation of the secondary battery; and
a switch unit that switches the operation of the secondary battery in accordance with instruction from the controller.
(14) An electrically driven vehicle including:
the secondary battery according to any one of (1) to (12);
a converter that converts electric power supplied from the secondary battery into driving force;
a driving unit to be driven in accordance with the driving force; and
a controller that controls operation of the secondary battery.
(15) An electric power storage system including:
the secondary battery according to any one of (1) to (12);
one or two or more electrical appliances to which electric power is supplied from the secondary battery; and
a controller that controls electric power supply from the secondary battery to the electrical appliances.
(16) An electric tool including:
the secondary battery according to any one of (1) to (12); and
a moving unit to which electric power is supplied from the secondary battery.
(17) An electronic device including:
the secondary battery according to any one of (1) to (12) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A secondary battery comprising:
a positive electrode;
a negative electrode including a negative electrode current collector and a negative electrode active material layer, and
an electrolytic solution,
wherein the negative electrode active material layer is provided on the negative electrode current collector and contains a negative electrode active material,
wherein the negative electrode active material includes a carbon-containing material and a silicon-containing material, and
wherein a spreading resistance distribution in the negative electrode active material layer is 1.03 or more and 10 or less as measured by a scanning spreading resistance microscope.
2. The secondary battery according to claim 1, wherein
the carbon-containing material includes a plurality of particulate carbon-containing materials and the silicon-containing material includes a plurality of particulate silicon-containing materials,
a 10% particle diameter D10 (μm) of the plurality of particulate silicon-containing materials is 1 μm or more and 5 μm or less, and
a ratio of a median diameter D50 (μm) of the plurality of particulate silicon-containing materials to a median diameter D50 (μm) of the plurality of particulate carbon-containing materials is 0.1 or more and 0.5 or less.
3. The secondary battery according to claim 1, wherein
the carbon-containing material includes a plurality of particulate carbon-containing materials, wherein
an average aspect ratio of the plurality of particulate carbon-containing materials is 1.1 or more and 2.0 or less.
4. The secondary battery according to claim 1, wherein
a proportion (% by weight) of a weight of the silicon-containing material to a sum of a weight of the carbon-containing material and the weight of the silicon-containing material is 30% by weight or less.
5. The secondary battery according to claim 1, wherein
the negative electrode active material layer further includes a negative electrode conductive agent,
wherein the negative electrode conductive agent includes a fibrous carbon material and a flaky carbon material.
6. The secondary battery according to claim 5, wherein
a proportion (% by weight) of a weight of the fibrous carbon material to a sum of the weight of the fibrous carbon material and a weight of the flaky carbon material is 0.1% by weight or more and 3.0% by weight or less, or
a proportion (% by weight) of the weight of the flaky carbon material to the sum of the weight of the fibrous carbon material and the weight of the flaky carbon material is 0.1% by weight or more and 3.0% by weight or less.

7. The secondary battery according to claim 1, wherein the negative electrode further includes a negative electrode binder, wherein
the negative electrode binder includes polyvinylidene fluoride.

8. The secondary battery according to claim 7, wherein a proportion (% by weight) of a weight of the negative electrode binder to a weight of the negative electrode active material layer is 2% by weight or more and 5% by weight or less.

9. The secondary battery according to claim 7, wherein a weight average molecular weight of the polyvinylidene fluoride is 300,000 or more and 5,000,000 or less.

10. The secondary battery according to claim 1, wherein the negative electrode active material layer further includes a polycarboxylic acid.

11. The secondary battery according to claim 10, wherein the polycarboxylic acid includes maleic acid.

12. The secondary battery according to claim 1, wherein the secondary battery includes a lithium ion secondary battery.

13. A battery pack comprising:
a secondary battery;
a controller configured to control operation of the secondary battery; and
a switch configured to switch operation of the secondary battery in accordance with instruction from the controller, wherein
the secondary battery includes
a positive electrode;
a negative electrode including a negative electrode current collector and a negative electrode active material layer, and
an electrolytic solution,
wherein the negative electrode active material layer is provided on the negative electrode current collector and contains a negative electrode active material,
wherein the negative electrode active material includes a carbon-containing material and a silicon-containing material, and
wherein a spreading resistance distribution in the negative electrode active material layer is 1.03 or more and 10 or less as measured by a scanning spreading resistance microscope.

14. An electrically driven vehicle comprising:
a secondary battery;
a converter configured to convert electric power supplied from the secondary battery into driving force;
a driver configured to be driven in accordance with the driving force; and
a controller configured to control operation of the secondary battery, wherein
the secondary battery includes
a positive electrode;
a negative electrode including a negative electrode current collector and a negative electrode active material layer, and
an electrolytic solution,
wherein the negative electrode active material layer is provided on the negative electrode current collector and contains a negative electrode active material,
wherein the negative electrode active material includes a carbon-containing material and a silicon-containing material, and
wherein a spreading resistance distribution in the negative electrode active material layer is 1.03 or more and 10 or less as measured by a scanning spreading resistance microscope.

15. An electric power storage system comprising:
the secondary battery according claim 1;
one or two or more electrical appliances to which electric power is configured to be supplied from the secondary battery; and
a controller configured to control electric power supply from the secondary battery to the electrical appliances.

16. An electric tool comprising:
the secondary battery according to claim 1; and
a moving unit to which electric power is configured to be supplied from the secondary battery.

17. An electronic device comprising:
the secondary battery according to claim 1 as an electric power supply source.

* * * * *